United States Patent
Stanovskoy et al.

(10) Patent No.: US 8,157,691 B2
(45) Date of Patent: Apr. 17, 2012

(54) TOOTHED WHEEL GEARING (VARIANTS) AND A PLANETARY TOOTHED MECHANISM BASED THEREON (VARIANTS)

(75) Inventors: Viktor V. Stanovskoy, Tomsk (RU); Sergey M. Kazakyavichyus, Tomsk (RU); Tatiana A. Remneva, Tomsk (RU); Vladimir M. Kuznetsov, Tomsk (RU)

(73) Assignee: Closed Joint Stock Company "Technology Market", Tomsk (RU)

( * ) Notice: Subject to any disclaimer, the term of this patent is extended or adjusted under 35 U.S.C. 154(b) by 223 days.

(21) Appl. No.: 12/644,190

(22) Filed: Dec. 22, 2009

(65) Prior Publication Data

US 2010/0095792 A1 Apr. 22, 2010

Related U.S. Application Data

(63) Continuation of application No. PCT/RU2008/000366, filed on Jun. 9, 2008.

(30) Foreign Application Priority Data

| Jul. 9, 2007 | (RU) | ................................. | 2007125891 |
| Aug. 31, 2007 | (RU) | ................................. | 2007134617 |
| Feb. 26, 2008 | (RU) | ................................. | 2008107285 |

(51) Int. Cl.
*F16H 1/32* (2006.01)
*F16H 57/08* (2006.01)

(52) U.S. Cl. ........................ 475/180; 475/344

(58) Field of Classification Search .................. 475/165, 475/168, 180, 344; 74/457
See application file for complete search history.

(56) References Cited

U.S. PATENT DOCUMENTS

| 3,247,736 A | | 4/1966 | Roth | |
| 3,381,549 A | * | 5/1968 | Hirakawa | ....................... 475/165 |
| 4,858,487 A | * | 8/1989 | Mercier | ....................... 74/424.7 |
| 5,522,278 A | * | 6/1996 | Panjuchin | ....................... 74/424.7 |
| 6,702,704 B2 | * | 3/2004 | Ai | ....................... 475/165 |

FOREIGN PATENT DOCUMENTS

| GB | 2161887 A | 1/1986 |
| SU | 911069 A1 | 3/1982 |
| SU | 1060835 A1 | 12/1983 |
| SU | 1581938 A1 | 7/1990 |
| SU | 1585577 A1 | 8/1990 |

OTHER PUBLICATIONS

International Search Report, mailed Aug. 21, 2008, from International Application No. PCT/RU2008/000366, filed Jun. 9, 2008.

(Continued)

*Primary Examiner* — Edwin A Young
(74) *Attorney, Agent, or Firm* — Houston Eliseeva, LLP

(57) ABSTRACT

The engagement of gearwheels with curvilinear teeth is intended to create small-sized mechanical gears of rotational motion with big gear ratio in one stage. The smaller gearwheel—pinion (16)—has one tooth, having in its face section the shape of circumference (3), eccentrically shifted with respect to the axis OO1 of the gearwheel (16). The curvilinear helical tooth of the gearwheel (16) (helical eccentric) is generated by sequential shifting of the circumference 3 along the axis OO1 and its continuous turning around the axis. The greater gearwheel (17) has helical teeth, generated by turning of the cycloidal curve (5), the teeth are conjugated with the helical surface of the pinion (16). The engagement has a continuous line of contact along the whole length of the tooth, where in each section a circular pin tooth and a cycloid are engaged, having minimum losses for friction. In order to eliminate axial loads, occurring in engagement of helical teeth, the gearwheels (16) and (17) are made herring-bone. The similar eccentrically cycloidal engagement can be implemented by assembled gearwheels. On the basis of the engagement one can design cylindrical gearboxes with parallel shafts, bevel gearboxes with intersecting shafts, and also planetary gears according to David and James schemes, possessing the increased load carrying capacity at smaller overall dimensions.

15 Claims, 22 Drawing Sheets

OTHER PUBLICATIONS

International Preliminary Report on Patentability, dated Feb. 9, 2010, from International Application No. PCT/RU2008/000366, filed Jun. 9, 2008.

Artobolevskiy, I.I., "Theory of mechanisms and machines," M., <<Nauka>>, 1988, p. 156.

Baturin A.T. et al., "Machine parts," M. Mashinostroyeniye, 1970, p. 264.

Kraynev, A.F., "Reference dictionary on mechanisms," M. <<Mashinostroyeniye>>, 1987, p. 290.

Shannikov, V.M., "Planetary gearboxes with non centrode engagement," M., <<Mashgiz>>, 1948, p. 4.

Zhuravlev, G.A., "Impropriety of physical fundamentals of Novikov's engagement as the reason of limitation of its application," Gearboxes and drives, 2006, 1(04), pp. 38-45.

* cited by examiner

TOOTHED WHEEL GEARING (VARIANTS) AND A PLANETARY TOOTHED MECHANISM BASED THEREON (VARIANTS)

RELATED APPLICATIONS

This application is a Continuation of International Application No. PCT/RU2008/000366, filed Jun. 9, 2008, which claims priority to Russian Patent Application Nos. RU 2007125891 filed Jul. 9, 2007, RU 2007134617 filed Aug. 31, 2007, and RU 2008107285 filed Feb. 26, 2008, all of which are incorporated herein by reference in their entirety.

FIELD OF THE INVENTION

The invention relates to mechanical transmissions for imparting the rotational motion, applying the toothed engagement of gears and it can find application in cylindrical, bevel and planetary gearboxes with high load carrying capacity.

BACKGROUND OF THE INVENTION

Commonly used involute engagement of gearwheels, along with all its advantages, has a number of drawbacks, such as insufficient load carrying capacity of teeth due to small curvature of flanks, comparatively high losses related to the presence of sliding friction (see Baturin A. T., Itskovich G. M. and oth. Machine parts, M. Mashinostroyeniye, 1970, p. 264). Moreover, involute engagement has restrictions according to the value of gear ratio for one stage. In practice the gear ratio of a single-stage gearbox seldom exceeds 7. All these drawbacks stipulate the search of new types of engagement.

The Novikov's engagement is known (see also there), where a linear contact of teeth is replaced by a point contact, and the transverse reconjugation is replaced by axial. This engagement has convex-concave helical teeth with opposite direction of a helix and with initial contact in a point, which is transmitted parallel to gearwheel axis under rotation. Profiles in the face section are drawn by circular arcs and have curvature of opposite signs. Rolling prevails in Novikov's engagement, that is why it has greater efficiency and possesses higher contact strength than the involute engagement at the same main dimensions. However, they have the increased sensitivity to variation of interaxial distance of gearwheels, high vibroacoustic activity, low design versatility, all this restricts the area of practical application of the engagement (see Zhuravlev G. A. Impropriety of physical fundamentals of Novikov's engagement as the reason of limitation of its application//Gearboxes and drives 2006-#1(04). —pp. 38-45).

Involute helical engagement (SU 1060835, U.S. Pat. No. 3,247,736) with the decreased tooth number of a smaller gearwheel—pinion—allows to increase the gear ratio at the same interaxial distances. In particular, a pinion can be manufactured with one tooth, having an involute profile in the normal section, and the gear ratio will be equal to a tooth number of the greater gearwheel. For this purpose a correction of helical teeth with the involute profile of the pinion and gearwheel is necessary, and it is necessary to perform the different correction here for driving and driven gearwheels (U.S. Pat. No. 3,247,736). We take this engagement as the prototype for the first version of the invention.

Production of a pinion with one helical tooth of a corrected involute profile has manufacturing difficulties, and the presence of points of inflection in the tooth profile, which are stress concentrators, decreases the strength and load carrying capacity of the engagement.

Engagement of assembled gearwheels is known, as, for example, in SU 911069, chosen as the prototype for the second version of the invention. The assembled gearwheel represents the set of at least three rigidly interconnected gear rims, their face profiles are turned with respect to each other at equal angles with the pitch, equal to the gearwheel angular tooth pitch angle divided by the number of rims in the gearwheel. Features of such engagement are similar to features of a helical engagement of teeth with the corresponding profile and the drawbacks are the same as for the described above drawbacks of the involute engagement.

Various schemes of planetary mechanisms are known, designed with gearwheels of involute engagement. So, in particular, a four-link planetary mechanism is known according to James scheme (I. I. Artobolevskiy. Theory of mechanisms and machines, —M., <<Nauka>>, 1988, p. 156). The device contains two central gearwheels, one of which has external and the other—internal teeth, the carrier and satellites, meshing with both central gearwheels. In the gearbox with this scheme, the central gearwheel with external engagement is mounted on the driving shaft, the gearwheel with internal engagement is usually stationary, and the carrier is connected with the driven shaft. The gearing has high efficiency (97-98%) and rather simple design. This mechanism is chosen as the prototype for the first version of a planetary gear on basis of the proposed engagement.

The main drawback of this mechanism is the small gear ratio, determined as the ratio of radii of central gearwheels. In order to increase the gear ratio, it is necessary to increase significantly the diameter of the gearwheel with internal engagement, that increases abruptly overall dimensions and mass of a gear. In practice, the gear ratio of a mechanism with such scheme does not exceed 10.

A planetary mechanism according to David scheme is known with internal, external or mixed engagement (V. M. Shannikov. Planetary gearboxes with non centrode engagement. M., <<Mashgiz>>, 1948, p. 4, and also A. F. Kraynev. Reference dictionary on mechanisms, M. <<Mashinostroyeniye>>, 1987, p. 290), which we choose as the prototype for the second version of a planetary mechanism on basis of the proposed engagement. The planetary mechanism contains a carrier with double satellites and two central gearwheels. Each of central gearwheels is engaged with the first or the second gearwheel of double satellites correspondingly and forms the first and the second rows of involute engagement. Central gearwheels can be both with external engagement, or one can be with external and the other—with internal (mixed) engagement. The mechanism according to David scheme with external engagement for big gear ratios has a very low efficiency (less than 0.2% for the gear ratio 10000 according to the estimation given in the book V. M. Shannikov. Planetary gearboxes with non centrode engagement. M., <<Mashgiz>>, 1948, p. 14), and the mechanism with mixed engagement with rather high efficiency allows to obtain the gear ratio only within the limits 8-15.

SUMMARY OF THE INVENTION

Therefore, the task of invention is the creation of a reliable engagement of gearwheels, possessing the increased strength and allowing to obtain high gear ratios for comparatively small overall dimensions, and also the creation of a simple planetary gear with high efficiency and high gear ratio.

The technical result of the invention is the increase of load carrying capacity of the engagement, providing high gear ratios for comparatively small overall dimensions. The technical result, achieved by the invention in planetary mechanisms, lies in increasing the gear ratio without the increase of overall dimensions. The additional result is the increase of load carrying capacity of a planetary mechanism for equal other conditions.

In order to achieve the pointed technical result, in the meshing of gears with curvilinear teeth, as in the prototype, the smaller of gearwheels—pinion—has one tooth. Unlike the prototype, the toothed profile of this gearwheel is generated by a consequent and continuous turning of face sections of the gearwheel, representing the circumference, with respect to the eccentrically shifted axis, forming the helical surface. The greater gearwheel has helical teeth with cycloidal profile in the face section, conjugated with helical surface of the pinion.

This means, that the curvilinear tooth surface of the greater gearwheel is generated similarly to the surface of the pinion tooth by a consequent and continuous turning of cycloidal face sections of the gearwheel around the gearwheel axis. Therefore, in any face section of engaged gearwheels there are profiles in the engagement, which are drawn by the eccentrically shifted circumference and cycloidal curve, that is why we will be calling further for abridgement the pointed type of engagement as the eccentrically cycloidal engagement.

In order to provide the continuous transmission of rotation, the angle of axial overlap must be greater than 180 degrees.

The pointed engagement can be implemented in various types of engagements (external and internal), for various kinds of gearwheels (cylindrical and bevel), and also for various schemes of planetary gears.

For cylindrical gearwheels with external engagement both pinion (smaller gearwheel) and the gearwheel are made cylindrical with parallel axes. The greater gearwheel is made with external toothed profile, having in the face section the shape of equidistant line to epicycloid. The face section of cylindrical gearwheels coincides with their lateral section. Therefore, the toothed profile of the pinion can be obtained by a consequent and continuous turning of all lateral sections of a cylindrical rod with respect to the eccentrically shifted axis.

For internal cylindrical engagement both gearwheels are also made cylindrical and with parallel axes. The profile of the greater gearwheel is made internal and in the face section it has the shape of equidistant line to hypocycloid.

Engagement can be also applied for gearwheels of bevel shape. In this case the pinion will be generated by a consequent and continuous turning of face sections of a cone with respect to the eccentrically shifted axis. And any cutting of such surface by the plane, perpendicular to the cone axis, will also be the circumference. The greater gearwheel will have a cycloidal profile in the face section. The face section for a bevel gear is the cutting by a bevel surface, perpendicular to the lateral surface of the gearwheel (by an additional cone).

Since the proposed engagement has helical teeth, there are axial components of forces in the engagement. In order to balance these components, it is reasonable to make herringbone gearwheels, that is, with segments with different directions of helical teeth.

In the second versions, the same principle of eccentrically cycloidal engagement is implemented not in the form of continuous engagement of helical teeth, but in the form of assembled gearwheels as, for example, in SU 911069. Each assembled gearwheel represents a set of at least three rigidly interconnected gear rims, the face profiles of which are turned with respect to each other at equal angles. Unlike the known engagement, the toothed profile of each pinion rim is drawn in face section by a circumference, eccentrically shifted with respect to the gearwheel axis, and the toothed profile of greater gearwheel rims is drawn in the face section by a cycloidal line. Here, the contact line of assembled gearwheels will be step-type and sectionally continuous.

Such engagement of assembled gearwheels can also be implemented for cylindrical gearwheels with internal and external engagement and for bevel gearwheels.

Beside simple gears, the principle of eccentrically cycloidal engagement can be implemented in various schemes of planetary gears, increasing multiply their load carrying capacity for the same overall dimensions compared with gears with involute engagement of gearwheels.

For this purpose, a planetary mechanism according to James scheme, like the prototype, comprises a central gearwheel with external engagement, a central gearwheel with internal engagement and satellites which are engaged with both central gearwheels. Satellites are mounted on axes of a carrier. Unlike the prototype, the central gearwheel with external engagement is made single-toothed, with the tooth profile as the eccentrically shifted circumference, that is, in the form of eccentric. Satellites (their number is not less than three) are made with teeth of cycloidal profile. The gearwheel with internal engagement can be made both pin and cycloidal. In a planetary mechanism, the eccentrically cycloidal engagement is simplified a little, since gearwheels with straight teeth, rather than with helical, can be applied. It is possible, because the central gearwheel (eccentric) in a planetary scheme is engaged simultaneously with several gearwheels (satellites) instead of one.

In order to increase the uniformity of gear operation, it is reasonable to manufacture a central gearwheel with external engagement, consisting of two or more identical gear rims (eccentrics) turned with respect to each other. The angle of turning is equal to the angular pitch divided by the number of rims and for a single-toothed gearwheel (eccentric) it is equal to 360 degrees divided by the number of rims. Next nearest satellites are separated in parallel planes one from the other along the axis. Satellites in each plane are engaged with one of rims (eccentrics) of the assembled gearwheel with external engagement. The gearwheel with internal engagement is engaged with rims of all satellites.

The same effect can be achieved, if both the gearwheel with external engagement and satellites are made assembled, with engagement of rims of the same name. But here it is necessary to make also the assembled gearwheel with internal engagement.

As a matter of fact, both versions represent the engagement of the assembled central gearwheel with at least six satellites, just in the first case satellites are separated in space both along the axis and along the circumference, increasing the number of axes of the carrier. In the second case rims of the satellite are separated only along the axis, and the carrier has smaller number of axes. But here the number of rims of the second central gearwheel is increased.

For the second version, the eccentrically cycloidal engagement is implemented in a planetary mechanism according to David scheme. Planetary toothed mechanism according to David scheme, like the prototype, comprises the carrier with double satellites, two central gearwheels which are engaged with the first and the second gearwheels of doubled satellites correspondingly, and which form two rows of engagement. Unlike the prototype, at least in one row of engagement smaller gearwheels are made single-toothed, with the tooth profile as the eccentrically shifted circumference. Gearwheels of greater diameter in this row are made with teeth of cycloidal profile, generating the eccentrically cycloidal (EC) engagement. The number of satellites rims in the row of EC engagement must not be less than three. The second row of engagement in this mechanism can be generated by gearwheels with usual involute profile of teeth.

It is reasonable to make step-type gearwheels of at least one of the rows of the eccentrically cycloidal engagement, assembled of two and more similar gear rims, turned with respect to each other at the angle, equal to the angular pitch of the gear rim, divided by the number of rims. That is, for a single-tooth step-type gearwheel with two rims, each rim will represent an eccentric, the eccentrics being turned with respect to each other at 180 degrees (the angular pitch is equal to 360 degrees and the number of gear rims is 2).

The second row of engagement in this planetary mechanism can also be made eccentrically cycloidal, that increases still greater the gear ratio of the mechanism at equal other conditions. That is, smaller gearwheels of the second row are made single-toothed, with the tooth profile as the eccentrically shifted circumference, and greater gearwheels, engaging with them, are made with teeth of cycloidal profile.

In order to increase the uniformity of rotation transmitting, gearwheels in both rows of the eccentrically cycloidal engagement can be made step-type, consisting of identical gear rims, rotated with respect to each other.

Central gearwheels in both rows can be with external or mixed engagement, that is, in one row the central gearwheel has the external engagement and in the other—internal engagement. The mechanism with the second central gearwheel with internal engagement has the higher efficiency and can provide greater gear ratio.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 7 shows the general view of engagement of bevel gearwheels with intersecting axes;

FIG. 8 shows separately the smaller gearwheel of this engagement—a bevel pinion; and FIG. 9 gives the axial section of the engagement.

FIG. 14 shows the longitudinal section; and FIG. 15 schematically shows the lateral section of a planetary mechanism with eccentrically cycloidal engagement of a single-rim gearwheel and three satellites.

FIGS. 16 and 17 show the same views for a gear with assembled double-rim gearwheel with external engagement and with satellites separated in different planes.

FIGS. 18 and 19 give the longitudinal section of the gear and the scheme of engagement of assembled double-rim gearwheels.

FIGS. 20 and 22 present schemes of planetary mechanisms with external and mixed engagement correspondingly.

FIGS. 21 and 23 show profiles of gearwheels for schemes from FIGS. 20 and 22 correspondingly, which have a usual involute engagement in one row and in the other row the engagement is made eccentrically cycloidal according to the invention.

FIG. 24 shows a planetary mechanism with eccentrically cycloidal engagement of step-type gearwheels.

FIGS. 25 and 26 present superposed on one view profiles of gearwheels with eccentrically cycloidal engagement in both rows for mechanisms according to schemes from FIGS. 20 and 21 correspondingly. In these figures gearwheels in one of rows of engagement are made step-type.

FIG. 27 shows as the example the design of the gearbox for amplifier of torques, made according to the scheme from FIG. 21 and having the eccentrically cycloidal engagement of step-type gearwheels in both rows.

DETAILED DESCRIPTION OF THE PREFERRED EMBODIMENTS

Figure 1:
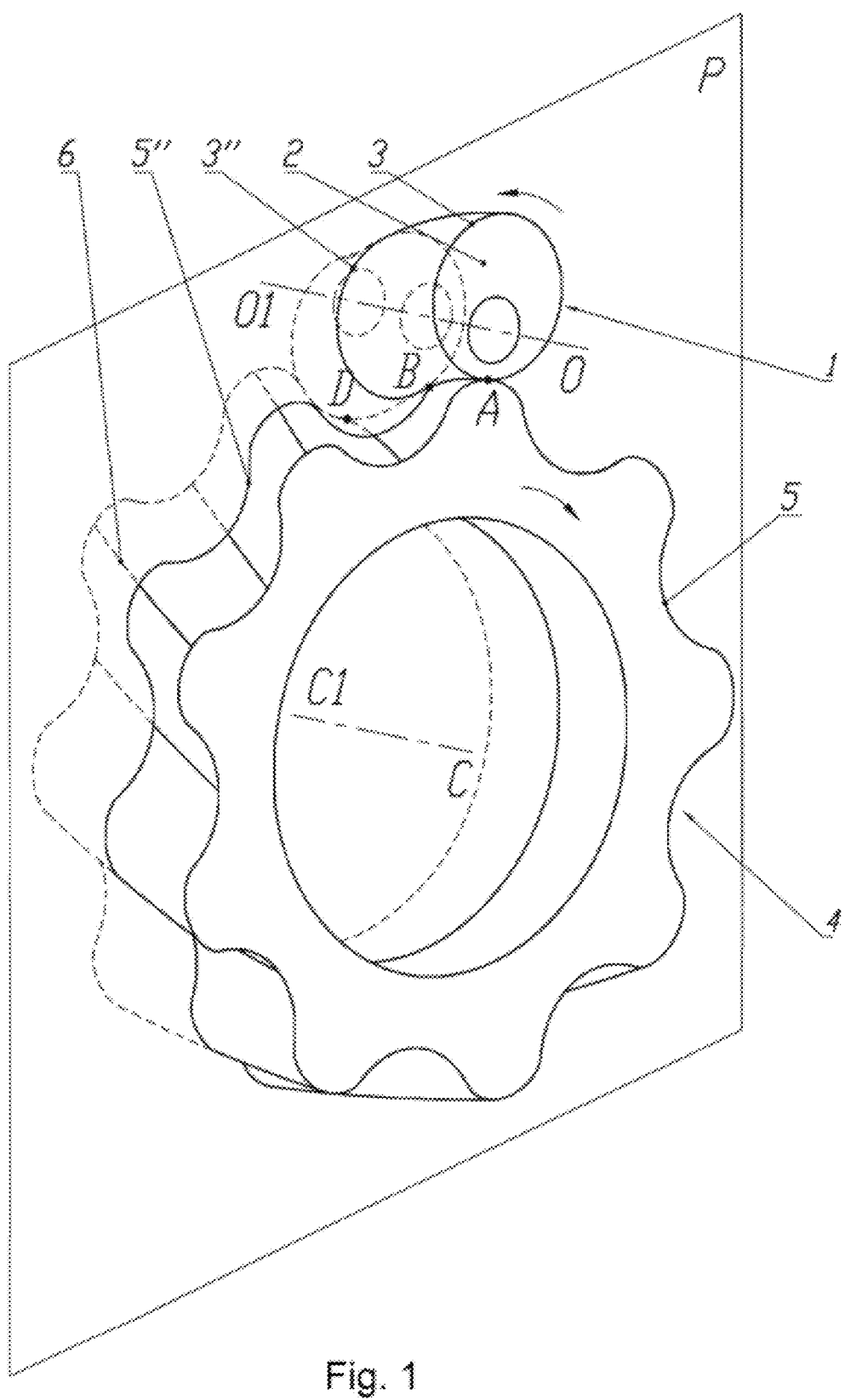
FIG. 1 represents the general view of the external engagement of cylindrical gearwheels with parallel axes.
Figure 3:
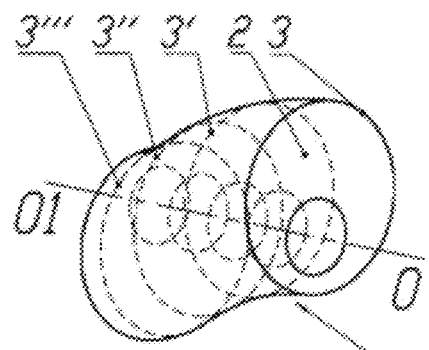
FIG. 3 illustrates the generation of the toothed surface of a smaller gearwheel pinion.
Figure 2:
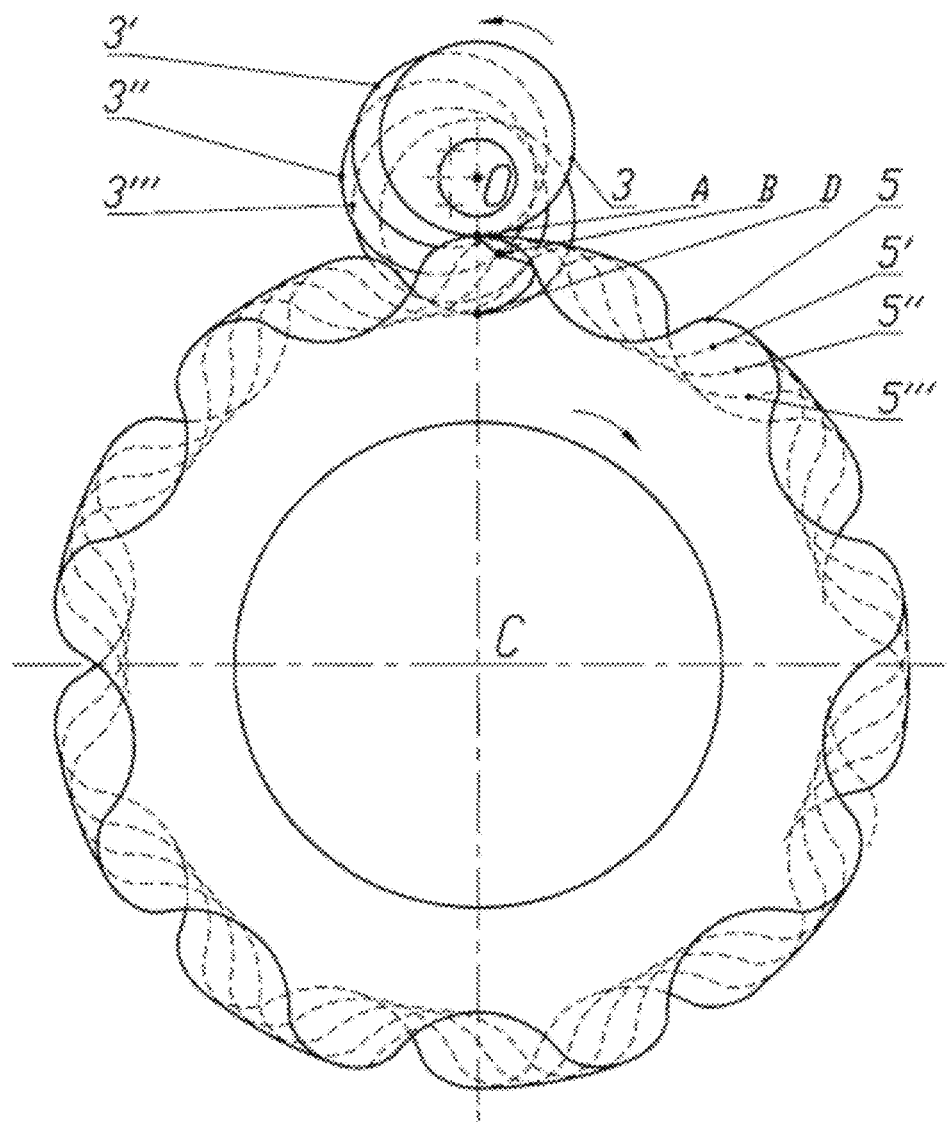
FIG. 2 shows the front view of the same engagement.

Let's consider the proposed engagement in more details. In FIG. 1 both gearwheels in the engagement are cylindrical, the smaller gearwheel—pinion 1—is made with one curvilinear tooth. Face section 2 of the pinion 1 represents the circumference 3, eccentrically shifted with respect to the gearwheel axis OO1. The tooth surface of the pinion is generated by a continuous shift of the circumference 3 along the axis OO1 and its simultaneous turning around this axis. Or, which is the same, the tooth surface of the pinion is generated by a continuous turning of consequent face sections of the gearwheel 1 around the axis OO1. In FIGS. 2 and 3 circumferences of separate generating lines of sections of the gearwheel 1, turned with respect to each other at 45 degrees, are designated as 3', 3", 3'''.

The external view of the pinion represents the helical eccentric. The tooth profile of the greater cylindrical gearwheel 4 has the shape of a cycloidal curve 5 in the face section. The cycloidal curve is understood in this description in the widest sense, they are equidistant lines to epi- and hypocycloids. In particular, for the gearwheel 4 with external teeth (FIG. 1) the curve 5 is the equidistant line to epicycloid. Line of apexes 6 of cycloidal teeth has a helical shape, that is, teeth of the gearwheel 4 are generated by a consequent shift and simultaneous turning of the cycloidal curve 5 along the axis CC1 of the gearwheel 4. Separate cycloidal curves in sections of the gearwheel 4, turned with respect to each other around the axis CC1 at 45/9=5 degrees, are designated as 5, 5', 5'' 5'''.

Figure 4:
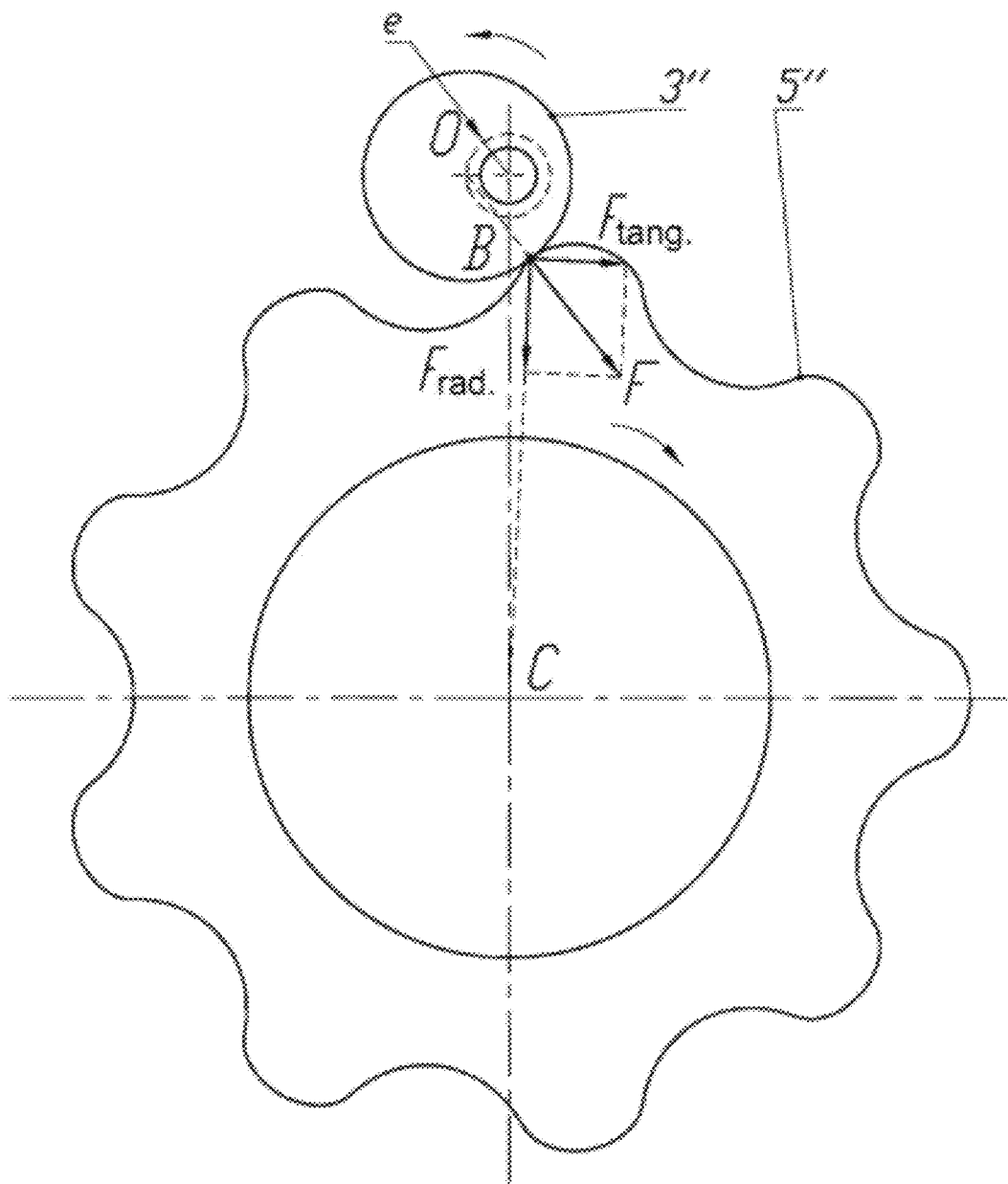
FIG. 4 gives the cutting of the engagement by a plane, perpendicular to gearwheel axes.

As it is seen from the scheme of constructing the toothed surface of a helical eccentric 1, the latter will have the circumference 3 in all its face sections. This circumference 3 in any face section has the point of contact with the cycloidal curve 5 of the greater gearwheel 4 (in FIGS. 1 and 2 the point of contact of gearwheels profiles in the near front plane is designated by the letter A). FIG. 4 shows the cutting of the engagement by the plane P, perpendicular to axes of gearwheels (see FIG. 1). In this plane the circumference 3'' of the section of the helical eccentric is turned around the axis OO1 at 90 degrees with respect to the circumference 3 at the face of the gearwheel, and the cycloidal curve 5'' is turned at the angle 90/z degrees with respect to the cycloidal curve 5 at the face of the gearwheel, where z is the number of periods of the cycloidal curve.

Figure 5:
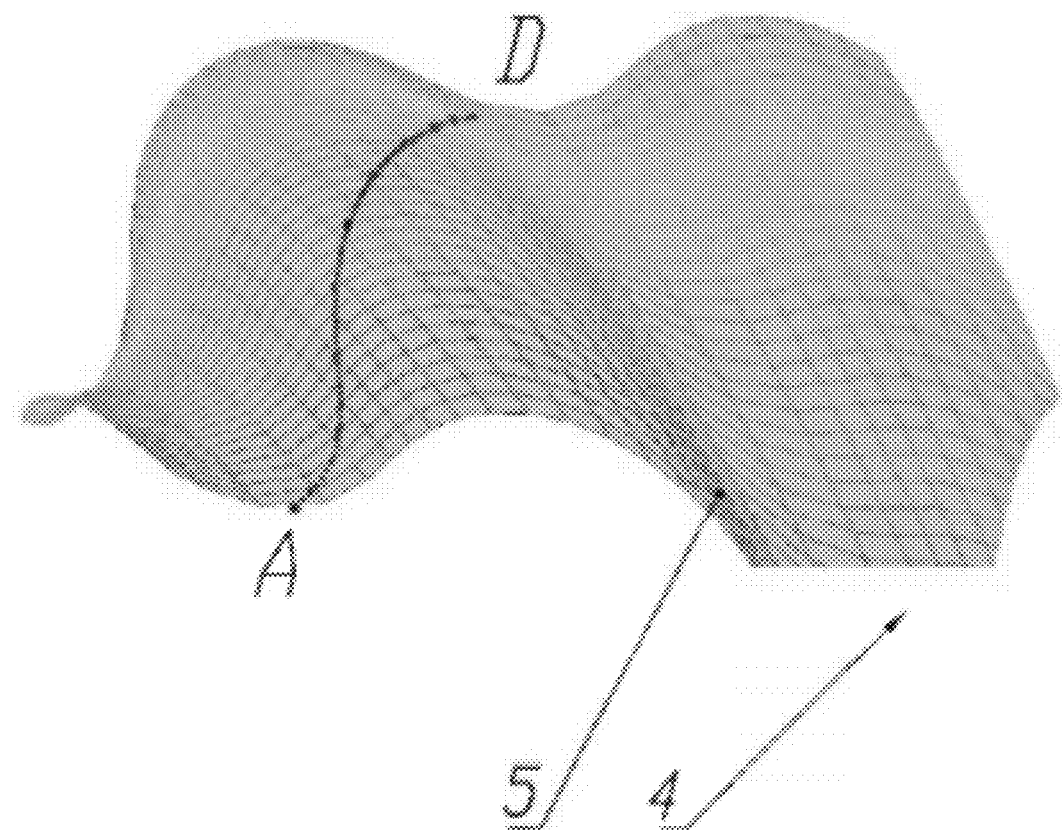
FIG. 5 gives the fragment of the engagement, made by means of computer-aided simulation.

That is, for the turning of the circumference 3'' at a quarter of revolution there is a turning of the cycloidal curve 5'' at a quarter of its angular pitch. The circumference 3 contacts the cycloidal curve 5'' in the point B. Therefore, in each face section the circumference in the section of a helical eccentric 1 contacts the cycloidal curve at the section of the gearwheel 4, and the helical tooth of the pinion 1 has simultaneously a plenty of points of contact with the helical cycloidal tooth of the gearwheel 4. These points generate a continuous helical line of contact ABD. FIG. 5 shows a fragment of the cycloidal gearwheel 4 and the line AD of its contact with a helical eccentric, made by means of computer-aided simulation. Therefore, the engagement can be considered as the totality of the set of engagements of the circular pin tooth and the cycloidal curve in different phases of engagement.

It is known according to the theory of gearing, that the cycloidal pin engagement operates mainly with the rolling friction (see, for example, Great Soviet Encyclopedia, item "Gearing"), that is, the proposed engagement has low losses for friction. Moreover, the engagement of teeth with circular and cycloidal shape has maximum possible radii of curvature, that considerably increases the load carrying capacity of the gear. High gear ratio in one stage, as in the prototype, is provided by the minimum tooth number of the pinion, equal to 1. Eccentric and cycloidal teeth practically do not have dedendum, that is why they operate only under contact loads, unlike involute profiles, which operate also with bending. It is known, that the contact strength of the material is considerably higher than the bending strength.

Figure 6:
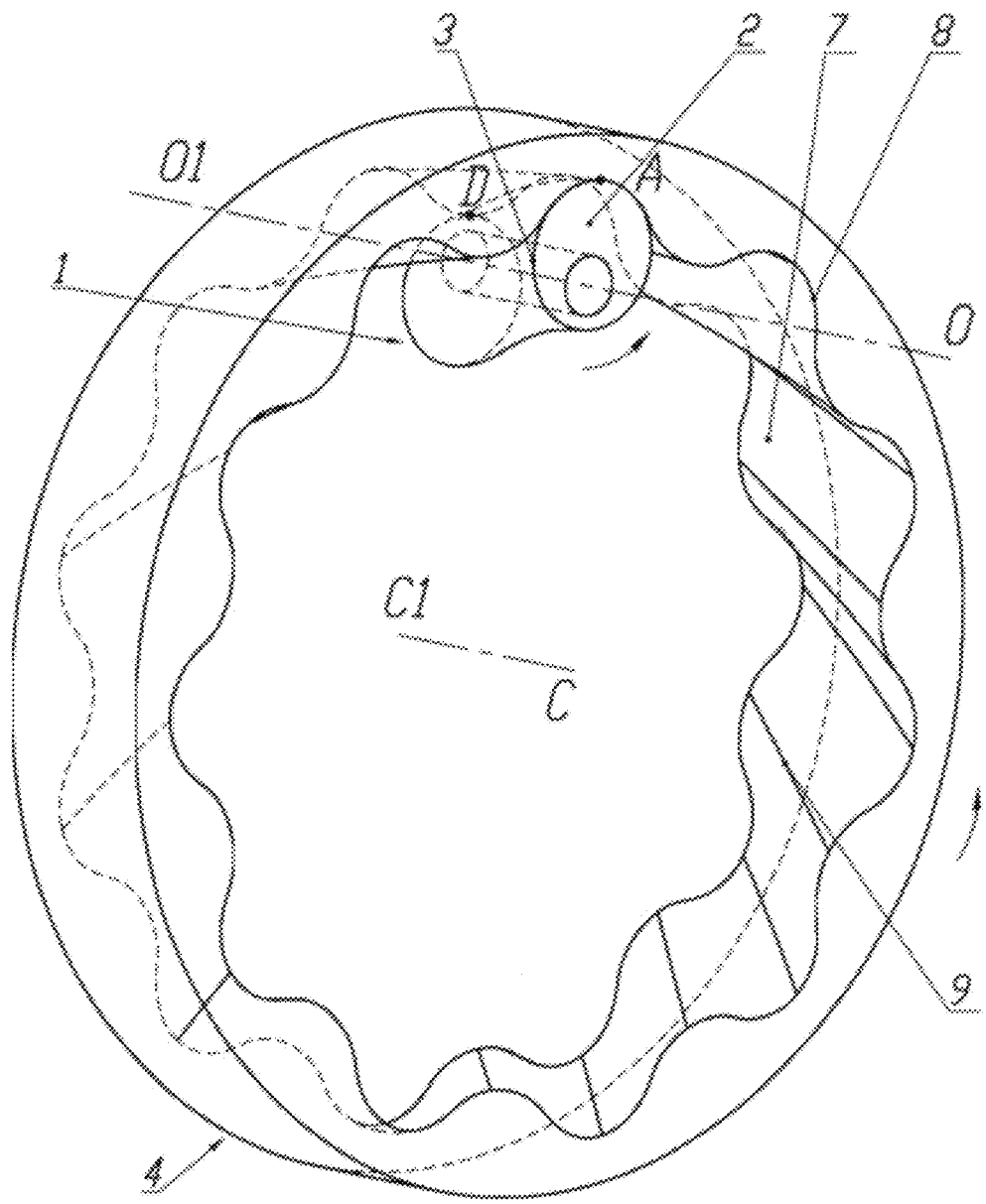
FIG. 6 shows the appearance of the internal engagement of cylindrical gearwheels with parallel axes.

In engagement in FIG. 6 the greater gearwheel 4 has the internal toothed profile 7, generated by the shift along the axis CC1 with simultaneous turning of the cycloidal curve 8, representing the equidistant line to hypocycloid. Consequently, a gearwheel with internal engagement is generated, its tooth tops form the helical line 9. The helical eccentric 1 has the same shape, generated by turning around the axis OO1 and shift along it of the circumference 3, eccentrically shifted with respect to the axis OO1. The point of contact of the circumference 3 of the helical eccentric 1 with hypocycloidal curve 8 in the near front plane of engagement is designated in FIG. 6 by the letter A, and in the far front plane—by the letter D. The helical eccentric 1 has a continuous contact with the toothed profile of internal engagement 7 along the line AD.

Figure 7:
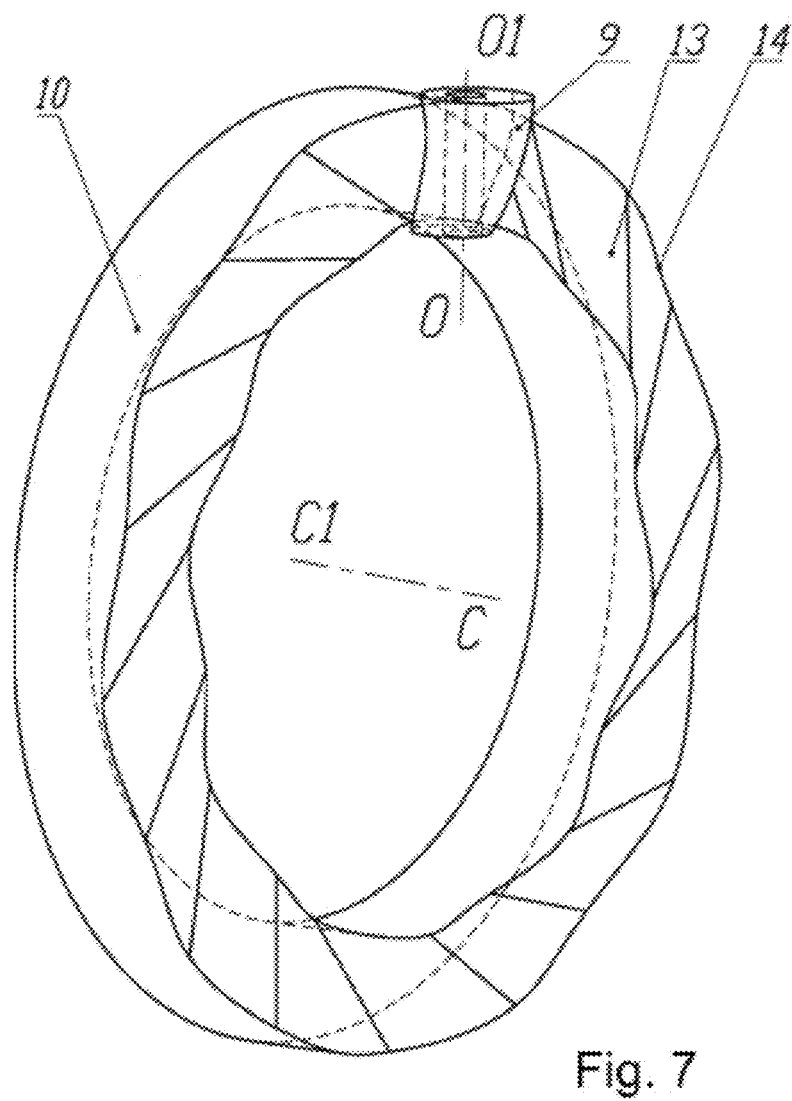
FIGS. 7, 8 and 9 illustrate the proposed engagement in case of bevel gearwheels.
Figure 8:
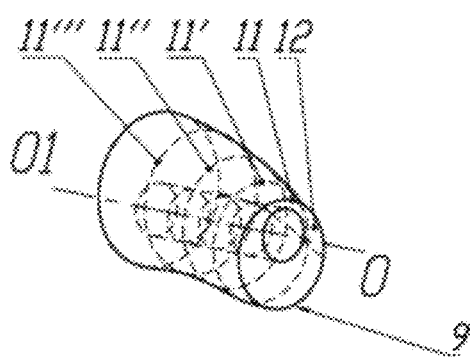

Let's consider now the engagement of bevel gears in FIG. 7. The smaller gearwheel of the engagement—pinion 9—and the greater gearwheel 10 have a bevel shape and intersecting axes OO1 and CC1. The pinion 9 is generated by a consequent and continuous turning around the eccentrically shifted axis OO1 of circumferences 11 in face sections 12 of the cone, determining the shape of the bevel gearwheel. FIG. 8 illustrates the generation of the surface of a bevel helical eccentric. Numbers 11', 11'', 11''' designate circumferences in different sections, turned with respect to each other and with respect to the circumference 11 in the near front plane at 45 degrees. As it is seen from the figure, the bevel helical eccentric 9 differs from the cylindrical helical eccentric 1 only by variable dimensions of circumferences in consequent face sections.

Figure 9:
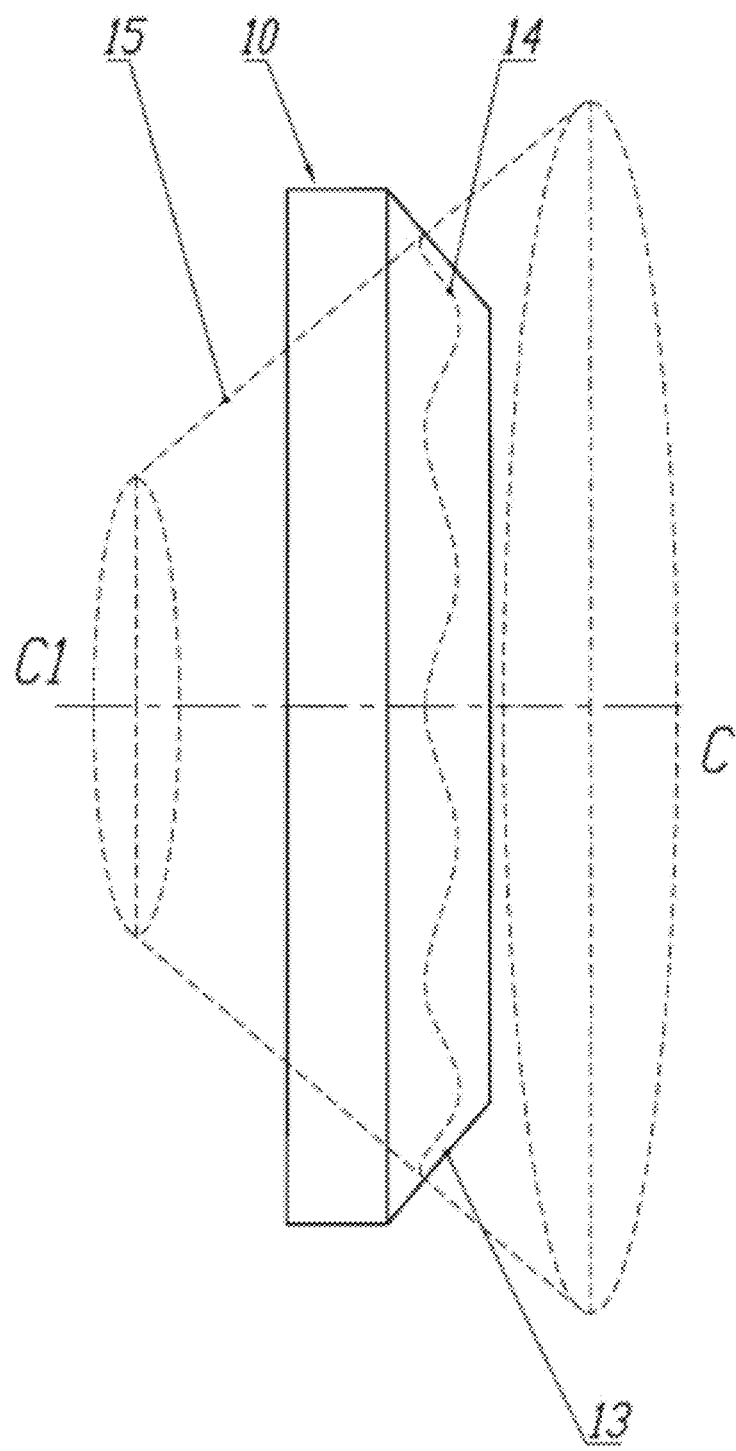

Correspondingly, the toothed surface 13 of the greater bevel gearwheel 10 has in face sections the shape of the cycloidal curve 14 (see FIG. 9). Face sections of a bevel gearwheel are its cutting by an additional cone 15. Teeth of the gearwheel 10 have a helical shape and are generated by a consequent turning of cycloidal curves 14 in its sections around the axis CC1 of the gearwheel. For such construction of the surface of the bevel helical eccentric 9 and toothed surface 13 of the bevel gearwheel 10, in each face section they will have the point of contact, and the contact will take place here between the circumference and the cycloidal curve, which have minimum losses for sliding friction in the engagement. All other described above advantages of the engagement of cylindrical gearwheels are also valid for bevel gearwheels.

Figure 10:
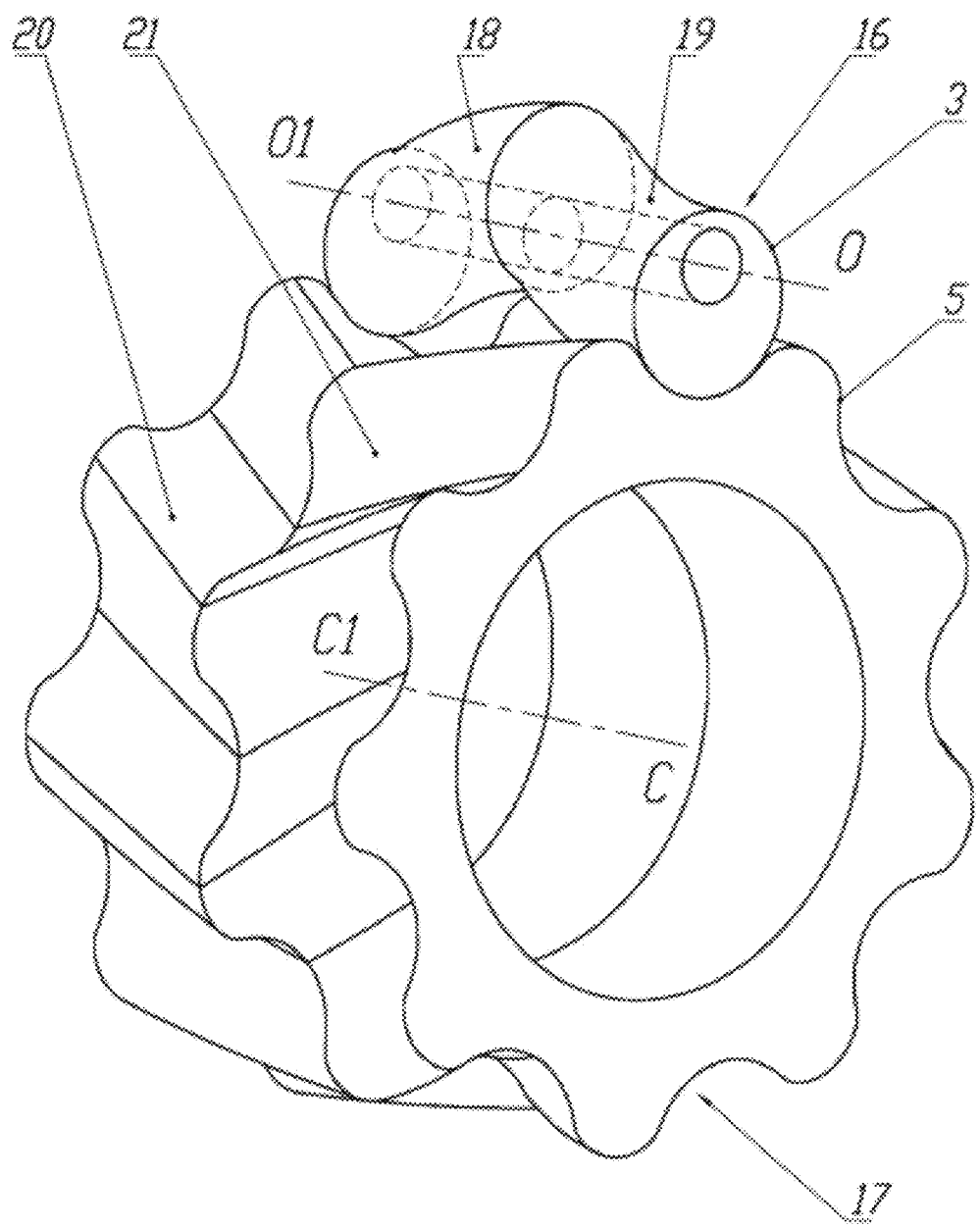
FIG. 10 shows the engagement of herring-bone cylindrical gearwheels.

There is an axial component of the force in engagement of cylindrical gearwheels in FIGS. 1 and 6, which pushes aside gearwheels and has a harmful effect on force characteristics of the engagement. When angles of tooth slope are small, this component can be neglected. For greater angles of tooth slope herring-bone gearwheels are applied (see FIG. 10). The pinion (helical eccentric 16) and greater gearwheel 17 are made herring-bone. The helical eccentric 16 has two segments 18 and 19 along the length, generated by helical surfaces with opposite direction. The circumference 3 in the face section of the helical eccentric at the segment 19 has a continuous clockwise turning around the eccentrically shifted axis OO1, and at the segment 18—counterclockwise turning. In exactly the same way the gear rim of the greater gearwheel 17 consists of two segments with right 20 and left 21 cycloidal teeth, generated by rotation of the cycloidal curve 5. It is obvious, that owing to the symmetry of teeth arrangement, the axial force components in the herring-bone engagement are mutually balanced.

Figure 11:
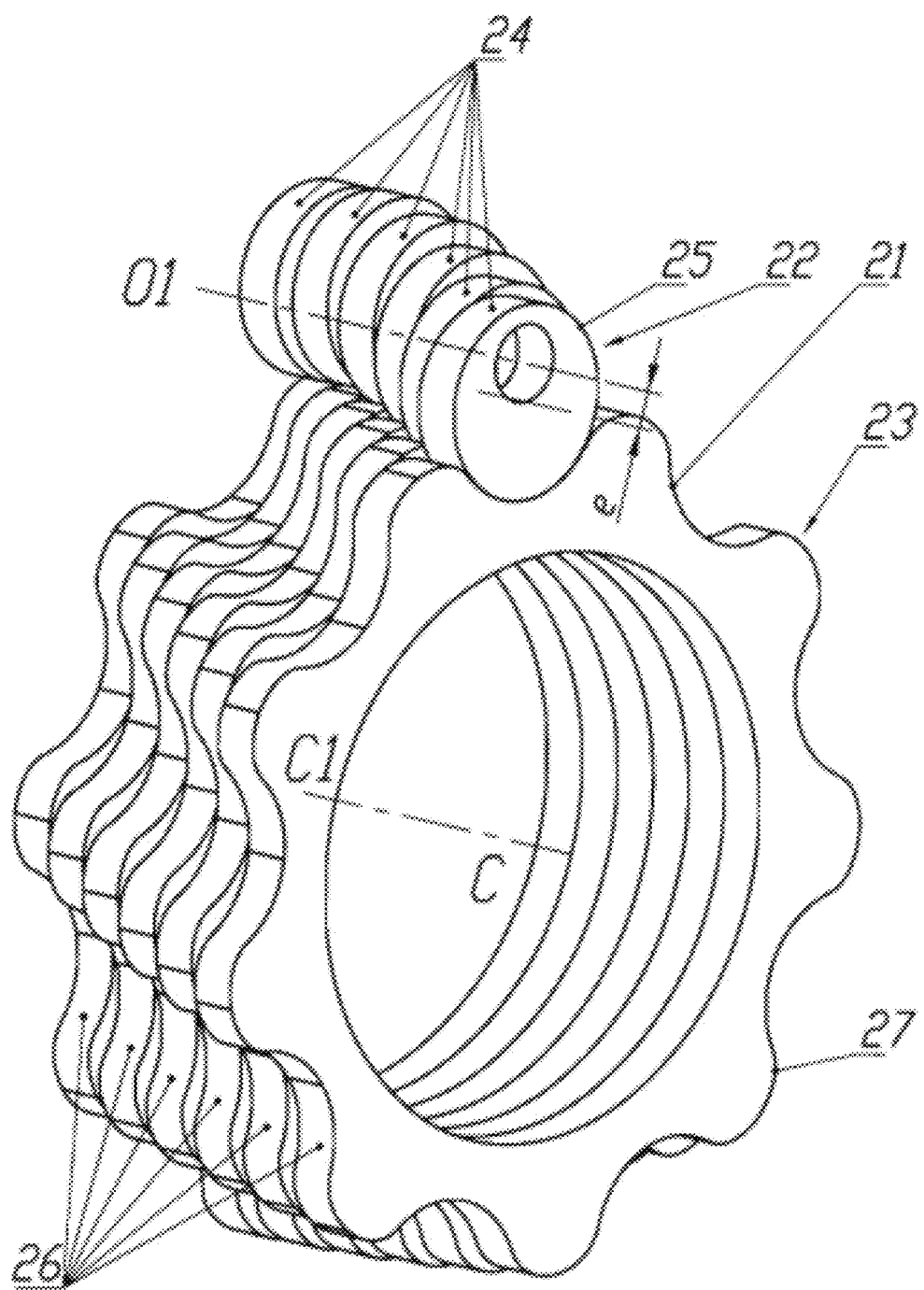
FIGS. 11 and 12 represent general views of engagement of assembled cylindrical gearwheels with external and internal engagement with parallel axes.

With all its advantages, the proposed eccentrically cycloidal engagement is rather difficult in production, it requires multiaxes CNC machines. For the version with assembled gearwheels, the same idea can be implemented at simpler equipment. The meshing of cylindrical assembled gearwheels with external engagement is shown in FIG. 11. Here both gearwheels 22 and 23 are made assembled of several gear rims turned with respect to each other. The small gearwheel—pinion 22—is assembled of six rims 24, each of them represents the circumference 25, eccentrically shifted with respect to the axis OO1 at the value of eccentricity E. Circumferences 25 of successive rims are turned around the axis OO1 with respect to each other at the angle, greater than or equal to 180 degrees divided by the number of rims, and therefore they generate the assembled eccentric 22. For six rims in FIG. 11 this angle is 30 degrees. This means, that the axial overlap of the assembled eccentric 22 will be greater than 180 degrees, and the gear ratio will be constant. The greater gearwheel 23 is also assembled of six rims 26, each of them having the form of the enveloping epicycloid 27.

Cycloidal profiles of successive rims are turned with respect to each other at the angle of 30/z degrees, where z is the tooth number of the cycloidal rim. Here, each pair of rims 24 and 26 of both assembled gearwheels contacts along the straight line, and the common line of contact of profiles represents the sectionally continuous broken curve. The problem of the axial force component does not exist for the engagement of assembled gearwheels, since it can be considered as the superposition of pairwise engagements of separate straight tooth rims. It should be noted, that increasing the number of rims of assembled gearwheels, we will be approaching the helical version of engagement. In its turn, the helical eccentrically cycloidal engagement can be considered as the engagement of assembled gearwheels, where the number of rims is infinitely large, and the angle of turning between successive rims is infinitely small.

Figure 12:
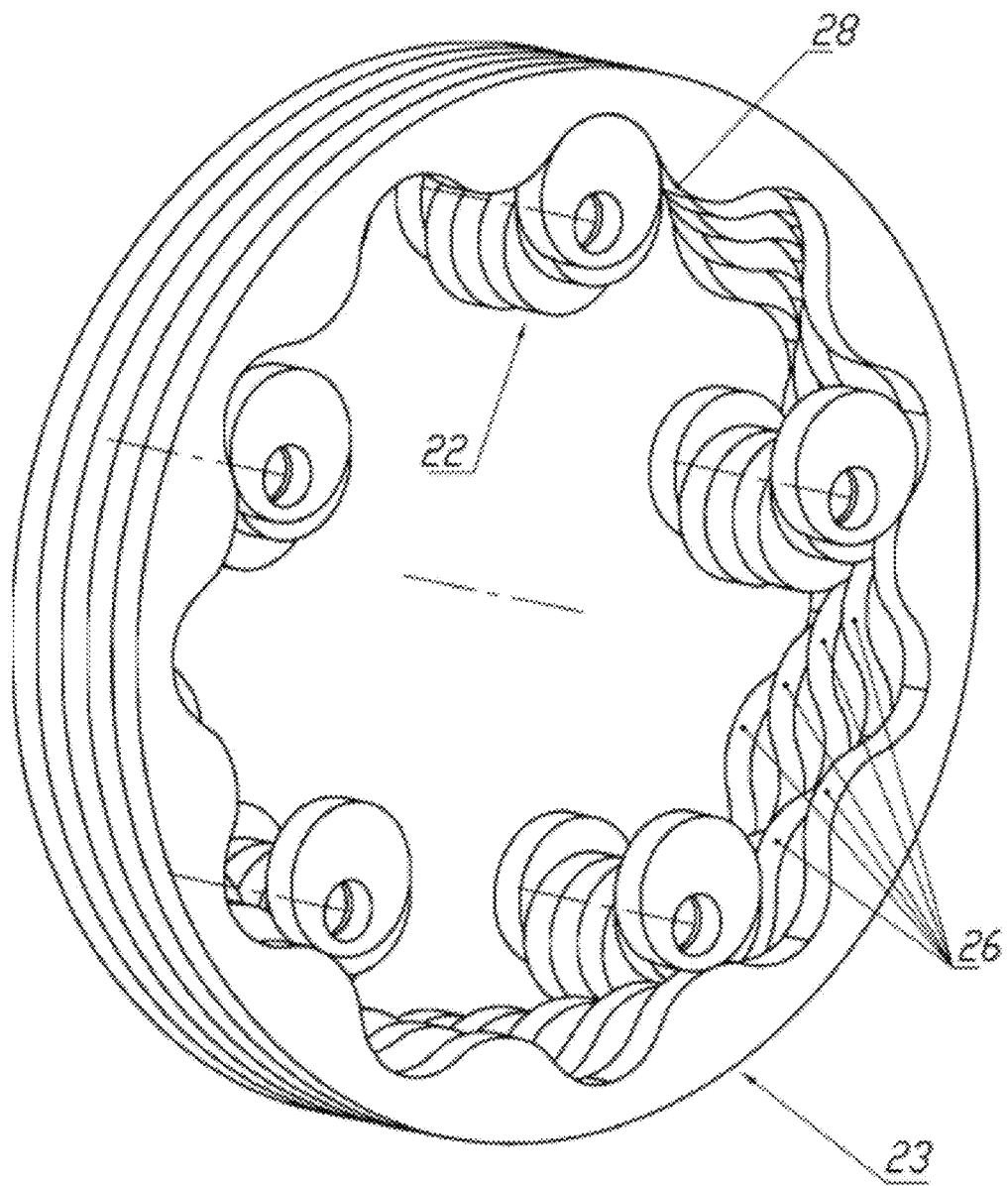

The engagement of assembled cylindrical gearwheels in FIG. 12 differs from the engagement in FIG. 11 only by the internal profile 28 of rims 26 of the greater gearwheel 23. The pinion 22 has exactly the same shape of an assembled eccentric as in FIG. 11.

Figure 13:
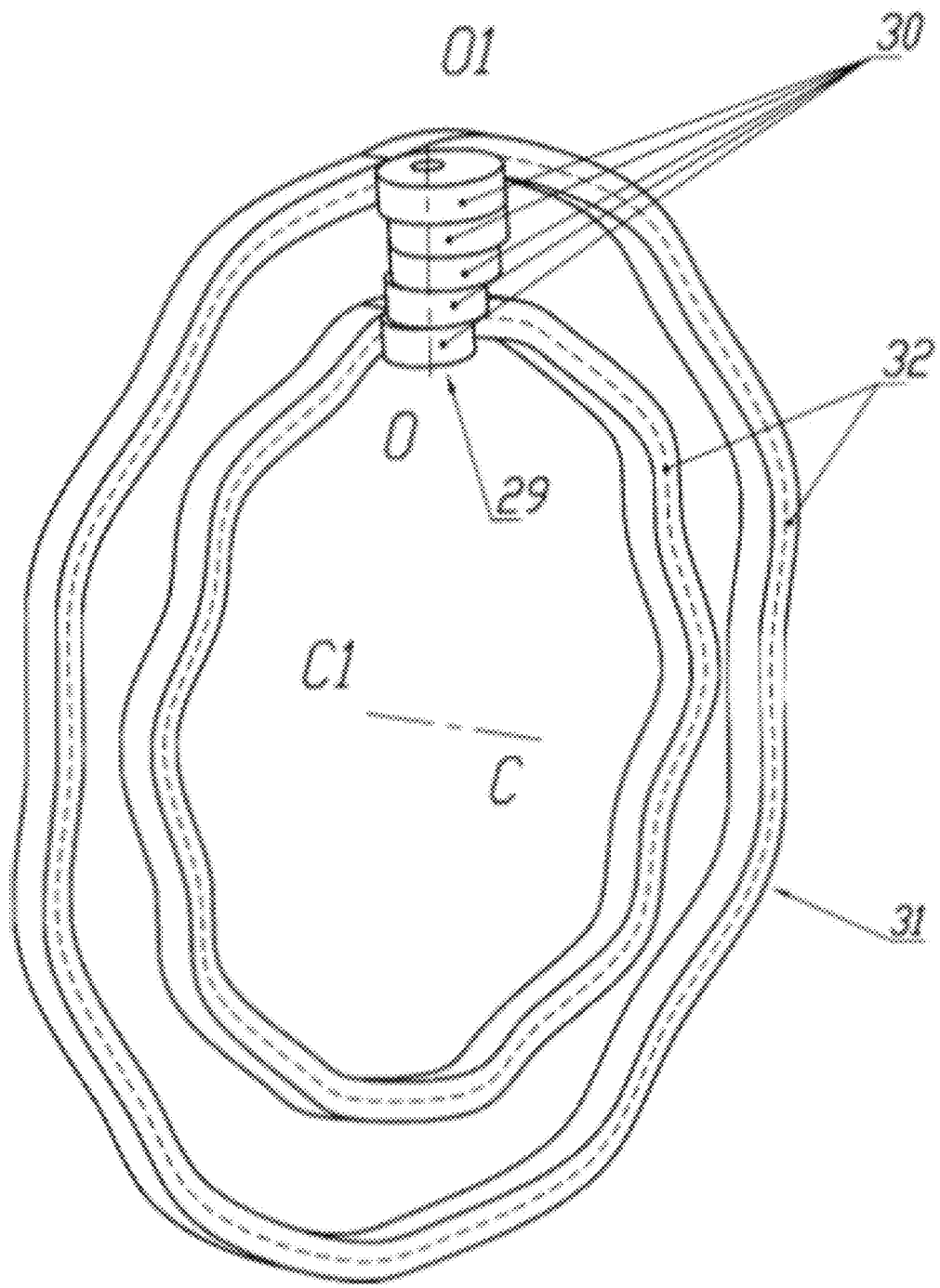
FIG. 13 shows the engagement of assembled bevel gearwheels with intersecting axes.

The version with assembled gearwheels can also be implemented for bevel gearwheels with intersecting axes (see FIG. 13). Here, a small bevel gearwheel—pinion 29—is assembled of separate eccentric rims 30, which represent cylinders of the decreasing diameter. The profile of each rim 30 represents the circumference, eccentrically shifted with respect to the axis OO1. Separate rims are turned with respect to each other at the angle, greater than of equal to 180 degrees divided by n, where n is the number of rims. In FIG. 13 the number of rims is equal to 5 and the angle between them is 36 degrees. The greater gearwheel 31 is also assembled of separate rims 32, having the cycloidal face profile, the successive rims being turned with respect to each other at ⅕ part of the angular pitch of the cycloidal rim 32 (or at the angle of 36 degrees/z, where z is the tooth number of the cycloidal rim. Figure shows only extreme rims of the greater gearwheel 31 for clearer representation. Increasing the number of rims of assembled gearwheels, we will be approaching the helical eccentrically cycloidal engagement of bevel gearwheels.

Let's consider the operation of the eccentrically-cycloidal engagement with a helical eccentric, shown in FIG. 1-5. When rotating the helical eccentric 1 around the axis OO1, the circumference 3 (3', 3", 3''' and so on), eccentrically arranged with respect to the axis, in any face section of the gearwheel 1 contacts with the cycloidal profile of the greater gearwheel 4 at the same section. Let the helical eccentric 1 rotate counterclockwise, as it is shown in figures. The circumference 3 in the front plane of the engagement (see FIG. 2), contacting with the top of the cycloidal tooth 5 when rotating around the centre O begins pressing on the tooth, causing the turning of the greater gearwheel 4 backwards at the value, equal to the half of its angular pitch.

After the half-turn of the helical eccentric 1, the circumference 3 will come to contact with the root of the cycloidal gearwheel 4 and at the next half-turn in this section there will be no force action on the gearwheel 4. Similar considerations can also be given for other face sections of gearwheels, where the force contact of meshing profiles will be performed only at a half-turn of the helical eccentric 1. If the angle of axial overlap of the helical eccentric 1 will be equal to or more than 180 degrees here, then the force contact will correspond to the complete turn of the eccentric 1. This means, that the rotation of the gearwheel 4 will be continuous and it will turn at one tooth during one revolution of the helical eccentric 1. That is, the gear ratio of the engagement is equal to the tooth number of the greater gearwheel and the rotation of gearwheels is oncoming.

FIG. 4 shows the action and distribution of forces in the middle section of the engagement. The force F has two components: $F_{rad}$—radial and $F_{tang}$—tangential. The latter transmits the torque moment. Since the gearwheel teeth have a helical shape, the axial component occurs. In order to eliminate it, a herring-bone engagement (see FIG. 10) can be applied, when one part of the helical eccentric has one direction of helical teeth 18 along the length, and the other part is performed with the opposite direction of helical teeth 19. Exactly so the herring-bone toothed profile of the greater gearwheel is also performed, consisting of two segments with right and left helical teeth. As the result, axial force components, arising in each of two segments, are directed oppositely and balance each other.

The internal engagement in FIG. 6 operates similarly. The only difference is that at the front plane of engagement the force contact of eccentric circumference 3 and cycloidal curve 8 begins at the tooth root of the greater gearwheel 4 and ends at its apex and the gearwheels have the accompanying rotation.

The process of bevel gearwheels engagement in FIG. 7 is similar, just thanks to bevel teeth, the rotation is transmitted between gearwheels with intersecting axes.

The process of engagement of step-type gearwheels with external and internal engagement in FIGS. 11 and 12, and also of bevel gearwheels in FIG. 13 is absolutely similar to the process of engagement of gearwheels with curvilinear helical teeth in FIGS. 1, 6 and 7, since it is the particular case of engagement of gearwheels with helical teeth.

On the basis of eccentrically cycloidal engagement, a simple planetary mechanism 2K-H according to James scheme can be constructed. Such mechanism is structurally simpler to design as the module with three links, rotationally movable with respect to each other, as it is shown in FIG. 14-19. However, the mechanism can also be traditionally designed as the stationary casing, with the driving and driven shafts, mounted inside the casing and connected with movable links of the mechanism.

Figure 14:
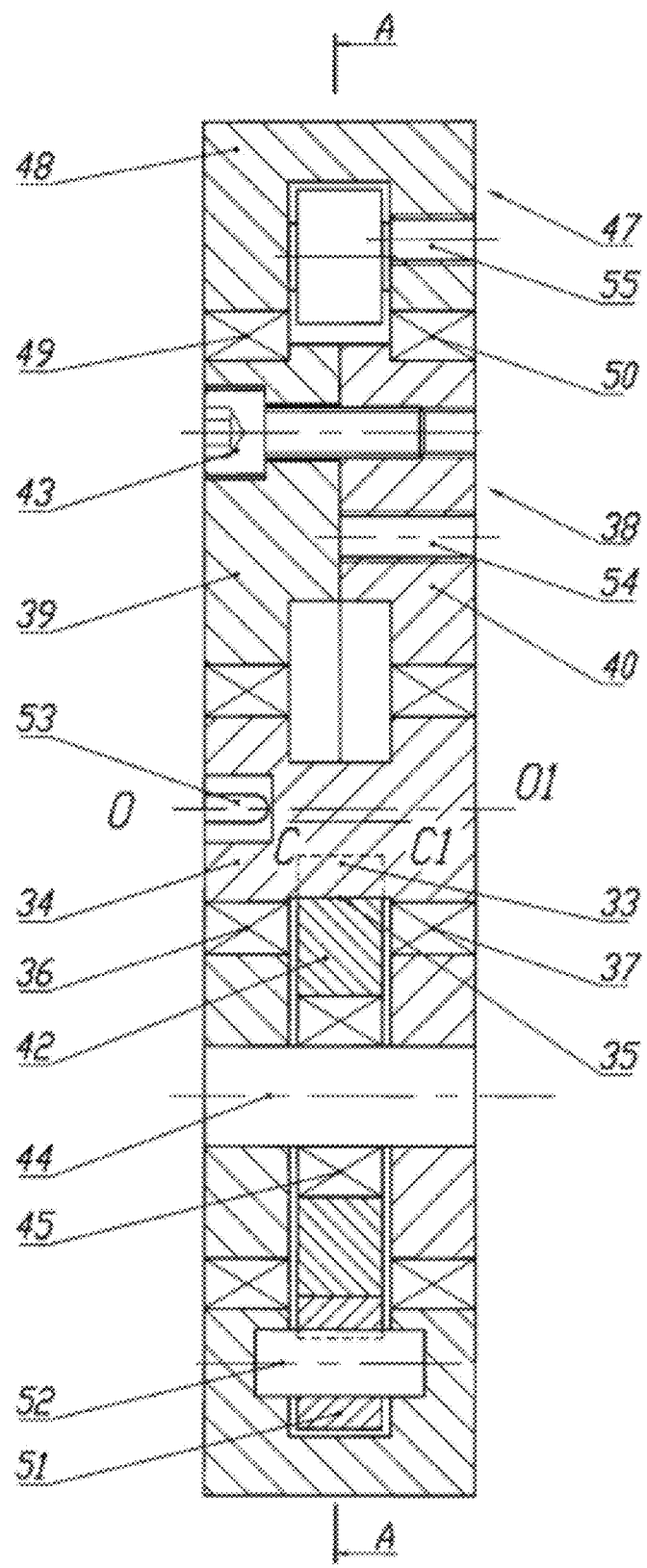
FIGS. 14-19 illustrate the version of application of eccentrically cycloidal engagement in a planetary mechanism according to James scheme, and, in particular.
Figure 15:
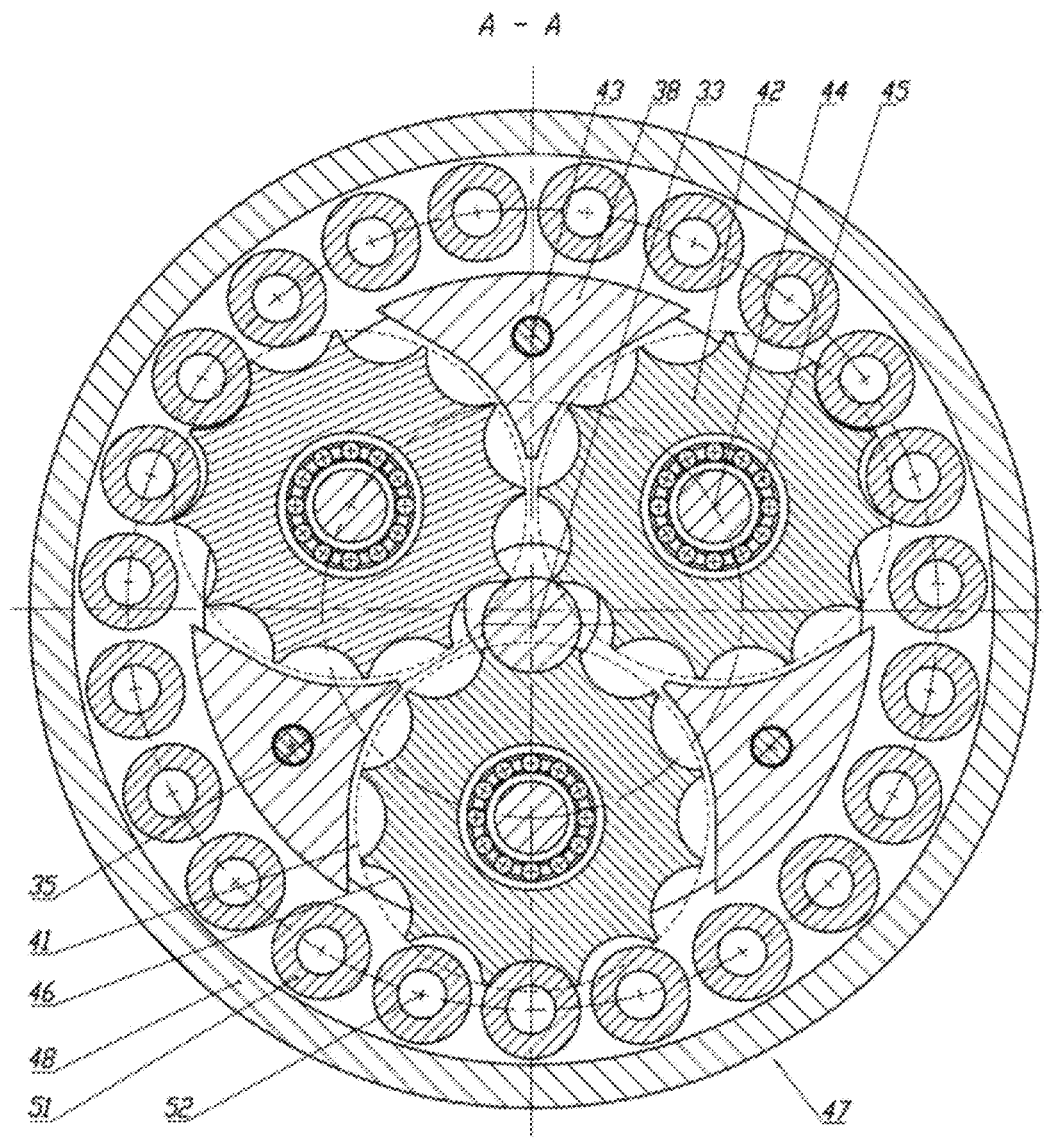

The mechanism in FIGS. 14 and 15 contains the central gearwheel with external engagement 33, made integrally with the through driving shaft 34. The section of the gearwheel 33 represents the eccentrically shifted circumference (eccentric) 35, which is the profile of the only tooth of the gearwheel 33. The carrier 38 is mounted at the through shaft 34 with bearings 36 and 37. The carrier represents two rigidly interconnected disks 39 and 40 with cuts 41 for arrangement of satellites 42.

The screw for fixing the disks 39 and 40 to each other is designated by number 43. Axes 44 are mounted in disks 39 and 40 of the carrier 38 in the domain of cuts 41. Satellites 42 are mounted on axes 44 in bearings 45. Satellites have the cycloidal gear rim 46 by which they are engaged with the eccentric 35 of the central gearwheel 33. If the number of satellites 42 is less than three, for example, for two satellites in the engagement of the eccentric 35 with cycloidal teeth 46, there are "dead" zones where the torque is not transmitted. When there are three satellites, at least one satellite is engaged with the circumference 35 in all its positions. For greater number of satellites, the uniformity of torque transmission from the gearwheel 33 to satellites 42 is increased.

The second central gearwheel with the internal engagement 47 is performed as the external hub 48, mounted by bearings 49 and 50 on disks 39 and 40 of the carrier 38. The rim of the gearwheel 47 is performed as pin teeth 51, mounted freely on axes 52, fixed in the hub 48. Cycloidal teeth 46 of satellites 42 are in the engagement with pin teeth 51. It should be noted here, that the rim of the gearwheel with internal engagement can also be cycloidal, as it will be shown below in FIG. 19. The cycloid and pin teeth are two versions of the toothed profile which can be engaged with the cycloidal profile 46 of satellites 42. The choice of profile is determined by specific requirements demanded to the gear. Cycloidal pin engagement has the increased efficiency, but it is more complicated in production. That is why, for strict requirements to the efficiency the pin toothing is chosen, and if manufacturability and product price are more essential, then the cycloid-cycloid engagement is chosen for the gearwheel 47 and satellites 42.

Therefore, the planetary mechanism represents the module of three coaxial and rotationally movable links with respect to each other: shaft 34, carrier 38 and gearwheel 47. Connecting one of them with the shaft of the motor, the other with the driven shaft and the third with the stationary casing, gears with different gear ratios can be obtained. FIG. 14 shows the elements of connection: the key 53 for the shaft 34, threaded holes 54 and 55 for the carrier 38 and gearwheel 47. It is the most convenient to make the external gearwheel 47 as the casing element. Then, when the shaft 34 is connected with the motor, the carrier 38 is connected with the driven shaft, we'll obtain the gearbox according to James scheme. The gear ratio i for this scheme is determined similarly as for the usual involute planetary gear $i=1-Z_{47}/Z_{33}$, where $Z_{47}/Z_{33}$ is the ratio of tooth number of the gearwheel with internal engagement 47 to the tooth number of the sun gearwheel 33. In our case the tooth number of the gearwheel 33 is minimum possible (equal to 1) and the gear ratio is equal to $1-Z_{47}=-22$, that is, negative and smaller by one for its absolute value than the number of pin teeth 51. That is, the rotation of the driven shaft will be taking place in the direction, opposite to the rotation of the driving shaft. When the input is from the carrier 38 and the shaft 34 is driven, it will be a multiplier with the same gear ratio. In case of a stationary carrier 38 and the driven shaft 47, we'll have a step-down gearbox with the positive gear ratio, equal to the tooth number 47, that is, number of pin teeth 51.

For the gear with involute engagement of the same dimensions and with comparable load carrying capacity, the gear ratio will be in 6-10 times less, because the minimum possible tooth number of pinion is 6, and it is usually taken not less than 10. When gear ratios and dimensions are comparable, the mechanism with eccentrically cycloidal engagement will have load carrying capacity greater in several times, due to smaller number of gearwheel teeth (and, correspondingly, greater tooth dimensions).

Figure 16:
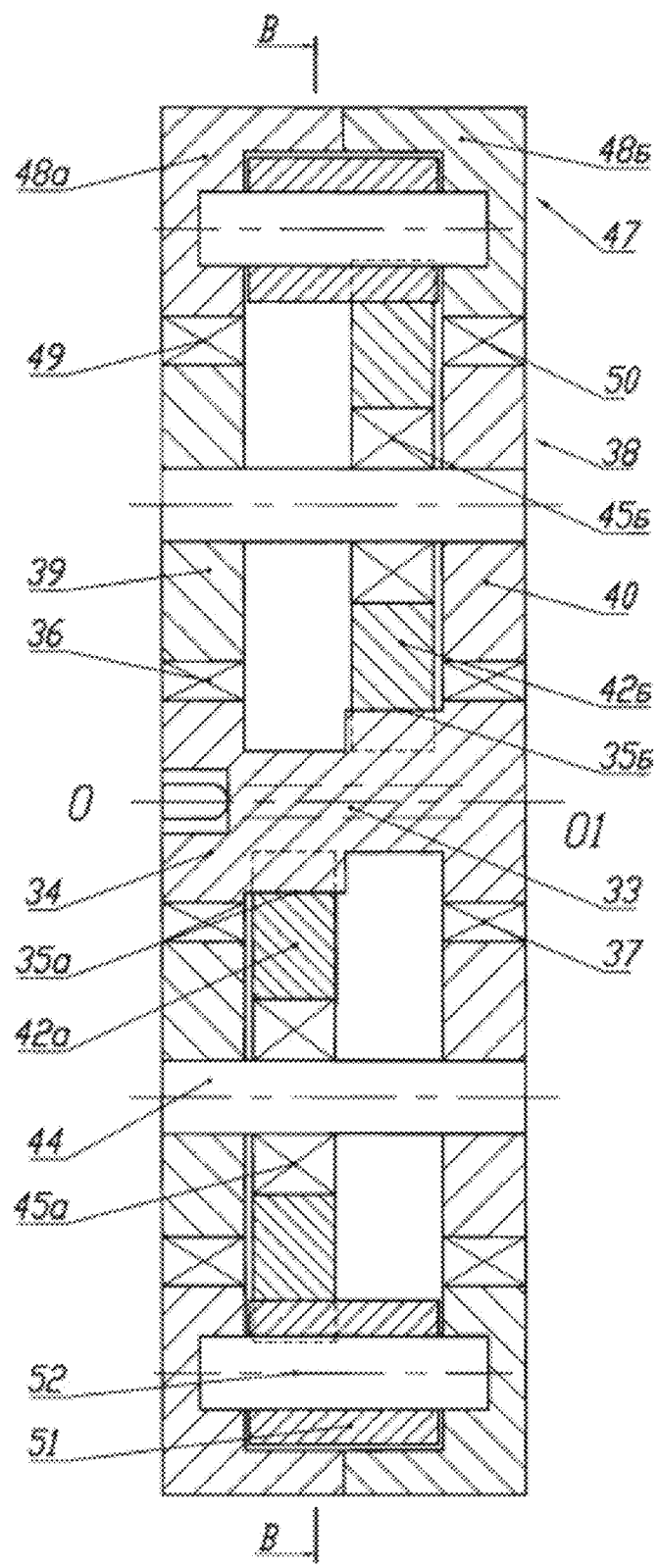
Figure 17:
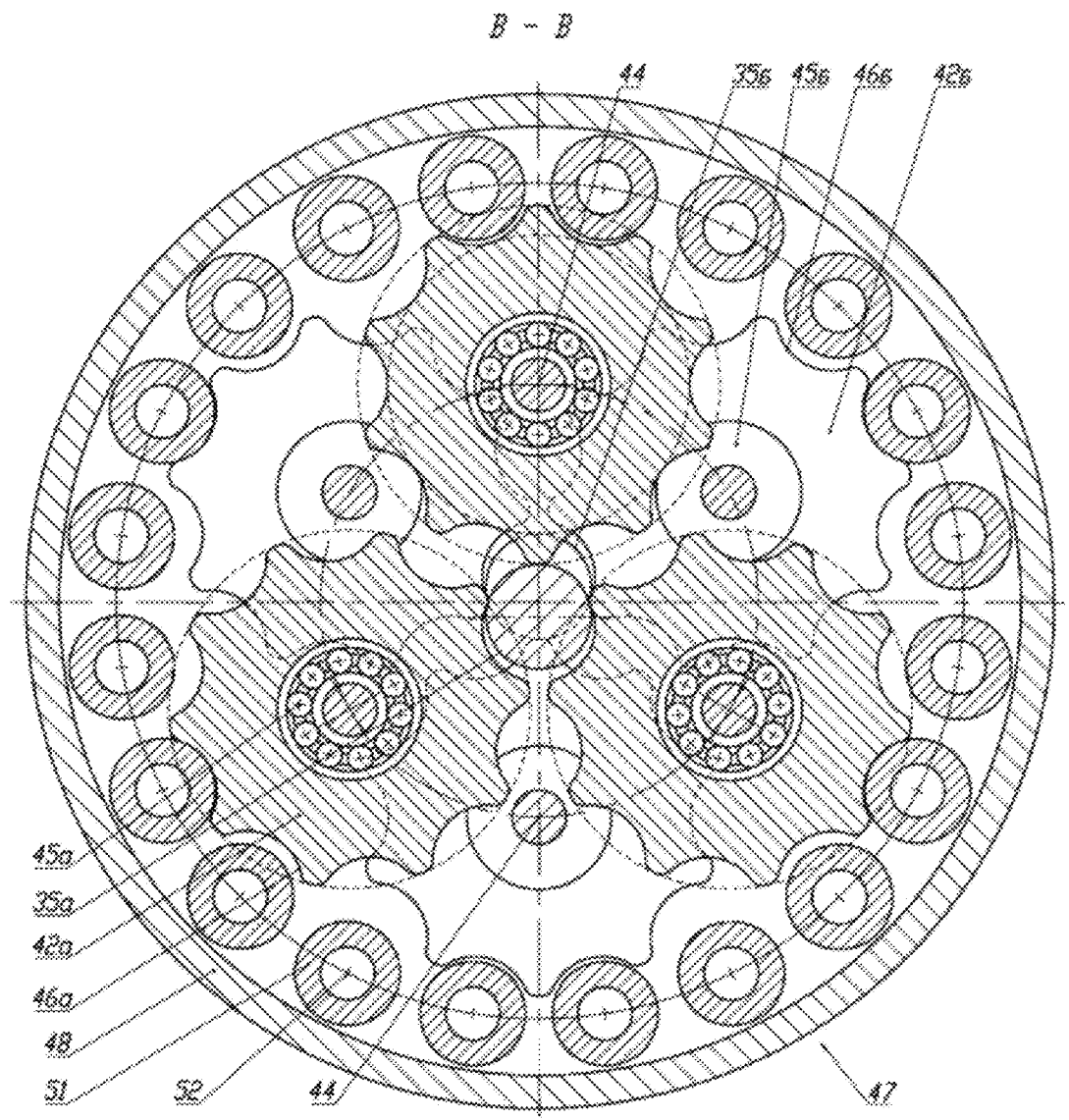

Let's turn to the mechanism in FIGS. 16 and 17. Its main difference from the previous mechanism is as follows: the gearwheel 33 with the external engagement is assembled of two rims 35a and 35b. Each rim represents in the section the eccentric circumference. Rims of the assembled double-rim gearwheel are turned with respect to each other at a half of the angular pitch, which is 180 degrees for a single-tooth gearwheel. That is, eccentrics 35a and 35b are shifted in opposite directions with respect to the gear axis. The rim 35a of the gearwheel 33 is interacted by cycloidal rims 46a of three satellites 42a, arranged in one plane with the rim 35a. The rim 35b is also interacted by rims 46b of satellites 42b, arranged in the other plane along the gear axis. All six satellites 42a and 42b are mounted with the possibility of rotation on six axes 44, fixed in disks 39 and 40 of the carrier 38. All satellites 42 are engaged by their rims 46 with one rim of the gearwheel with internal engagement 47. The gearwheel with internal engagement 47 has the hub 48, assembled of two halves— 48a and 48b for a simpler assembly. Elements of their fixation to each other are not shown in FIG. 16. Pin teeth 51, generating the rim of the gearwheel 47, are freely mounted in the hub 48 on axes 52.

In this gear, the uniformity of gearwheels rotation is increased, since the power flow is transmitted from the gearwheel 33 to the gearwheel 47 by all 6 satellites simultaneously. Thanks to separation of satellites 42a and 42b in parallel planes, the dimension of satellites can be chosen as maximum for the given distance between central gearwheels 33 and 47, since the successive satellites 42a and 42b are in different planes and do not intersect with each other. The gear has the increased number of axes 44 of the carrier 38. Disks 39 and 40 of the carrier 38 are rigidly connected with each other by axes 44. Elements of fixation of the carrier 38 and central gearwheels 33 and 47 to links of external mechanisms are not shown for simplicity. They can be any of known elements, for instance, threaded, key or spline. All other parts in FIGS. 16 and 17 are designated as in FIGS. 14 and 15.

Figure 18:
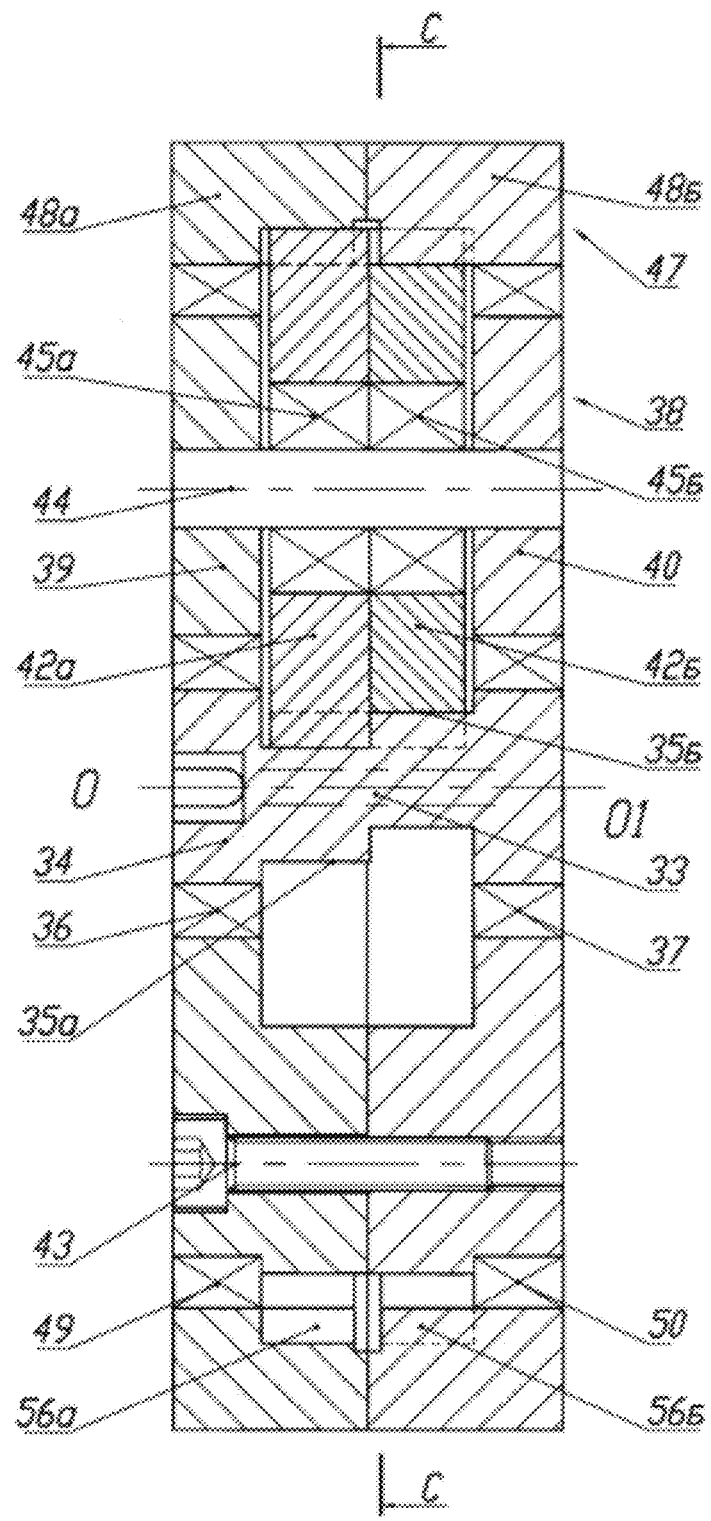
Figure 19:
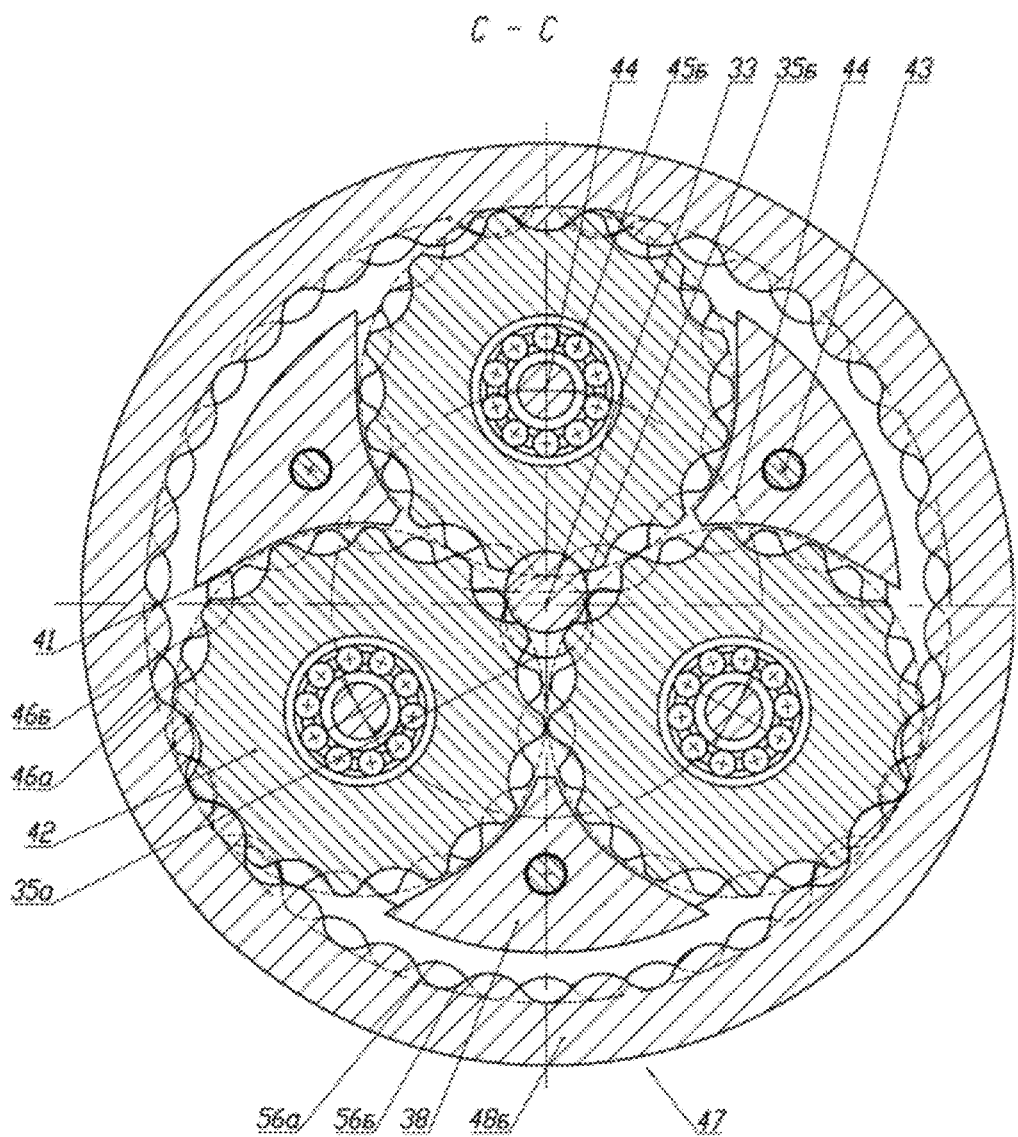
Figure 20:
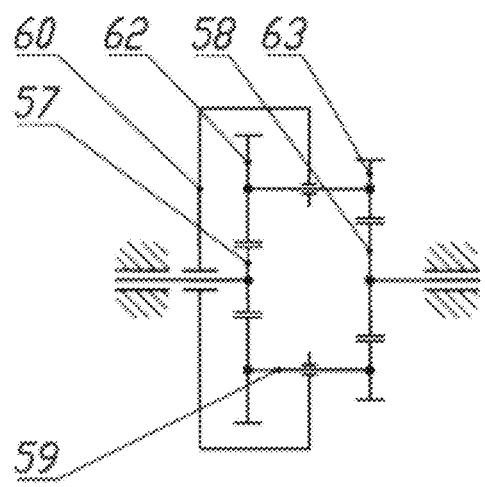
FIGS. 20-27 illustrate versions of application of eccentrically cycloidal engagement in a planetary mechanism according to David scheme.

In the gear in FIGS. 18 and 19, when the gearwheel 33 is also engaged with six rims of satellites, the number of axes of the carrier 38 remains the same as in FIG. 15. Here, in both engagements the gearwheels are made assembled of two rims, turned with respect to each other at the half of the angular pitch. Rims of the gearwheel 33 are eccentric circumferences 35a and 35b, shifted in directions, opposite to the gear axis. Three satellites 42 are mounted on three axes 44 by bearings 45 and they have two cycloidal rims 46a and 46b each. Rims 46a and 46b are turned with respect to each other at the half of the angular pitch. The gearwheel with internal engagement 47 is also assembled. It has two hubs 48a and 48b, joined together. Elements of fixation are not shown for simplicity. Each of hubs has its rim with internal engagement 56a and 56b. Rims 56a and 56b are also turned with respect to each other at the half of the angular pitch. Rims 56 are cycloidal, corresponding to cycloidal teeth of rims 46 of satellites 42.

In FIG. 18 rims 42a and 42b of satellites are not connected with each other, they are just mounted on the same axes 44 by their bearings 45a and 45b. But another version of such design is possible, when rims of satellites are rigidly connected with each other (or made as a single whole). The design with connected rims has greater rigidity and accuracy of positioning, and the design with free rims of satellites has the possibility of clearance adjustment and elimination of manufacture errors.

It should be noted, that assembled gearwheels can be made with greater number of rims turned with respect to each other at the half of the angular pitch. Increase of the number of rims complicates the design, but it increases the uniformity of gear operation and gear accuracy.

The proposed planetary mechanism operates in exactly the same way as a usual planetary mechanism with involute engagement, made according to the same James scheme. The difference is only in increase of gear ratio due to the decrease of the tooth number of the gearwheel with external engagement 33 down to one tooth. Formulas for definition of the gear ratio for various schemes of gear connection with shafts of external mechanisms are given above. For gears in FIGS. 14-15 and 18-19, the gear ratio is −22 for the driving shaft 34 and the driven carrier 38. For the gear in FIG. 16-17 the gear ratio will be −19 for the same connection scheme.

Let's turn now to planetary mechanisms according to David scheme, their varieties are shown in FIG. 20-27. The planetary toothed mechanism in FIGS. 20 and 21 contains two central gearwheels 57 and 58 with external engagement and double satellites 59 mounted on the carrier 60. The first gearwheels 62 of double satellites 59 and the central gearwheel 57, which is engaging with them, generate the first row of the engagement. The second gearwheels 63 of double satellites 59 together with the second central gearwheel 58 generate the second row of engagement. In the first row the gearwheel 57 and gearwheels 62 of satellites have a usual engagement formed by involute teeth 61 and 64 (see FIG. 21). Rims 65 of the second gearwheels 63 of satellites 59 in the second row of engagement are performed singe-toothed with the profile as the eccentrically shifted circumferences. The second central gearwheel 58 has a cycloidal gear rim 66. That is, gearwheels 63 of satellites and the gearwheel 58 generate the row of the eccentrically cycloidal engagement. The number of rims 65 of satellites in the row of the eccentrically cycloidal engagement must not be less than three. Actually, turning to FIG. 21 we see, that only in this case one or two single-toothed eccentric rims 65 are simultaneously in the phase of engagement approach. For smaller number of rims of satellites, there will be such positions of these rims, when all the rims 65 will be in the phase of disengagement with the cycloidal rim 66 of the central gearwheel 58, and the rotation from satellites 59 to the gearwheel 58 will not be transmitted. In the mechanism, illustrated in FIG. 21, the number of rims 65 of satellites in the row of engagement will be equal to the number of satellites. However, if gearwheels in engagement are made step-type, composed of several identical rims turned with respect to each other, then the number of satellites will be less than the number of rims, and the mechanism with two or even one satellite can be serviceable. It will be shown and described in more details below, when discussing the FIG. 24. The presented in FIGS. 20 and 21 planetary mechanism is differential, since all three of its main links (central gearwheels 57 and 58 and the carrier 60) are movable. In order to obtain a mechanical gear, one of these links should be made stationary. Depending on the choice of a stationary link and driving and driven links, the gear will have various gear ratios and can be both the multiplier and the step-down gearbox.

When the gearwheel 57 is driving, the gearwheel 58 is driven and the carrier 60 is stationary, the gear ratio of the mechanism according to David scheme is determined as $i_{57-58}=Z_{62}/Z_{57} \cdot Z_{58}/Z_{63}$ and since $Z_{63}=1$ for the eccentrically cycloidal engagement, then $i_{57-58}=Z_{62} \cdot Z_{58}/Z_{57}$, and for a real design in FIG. 1, 3 $i_{57-58}$ is 23.5. In case of the driven carrier 60 and stationary gearwheel 58, the gear ratio will be determined as $i_{57-60}=1-Z_{62} \cdot Z_{58}/Z_{57}=-22,5$. Therefore, the gear ratio of the proposed mechanism is theoretically in $Z_{63}$ (that is, in 6-10) times greater, than of the mechanism with a usual involute engagement in both rows. It should be noted, that it is better for a gearbox to perform the involute row at the input, since the eccentrically cycloidal engagement has greater maximum allowable torques. Actually, in the eccentrically cycloidal engagement, the convex profile of the tooth of eccentric 65 interacts with the concave profile of the cycloidal tooth 66, that increases their contact strength at equal other conditions. Moreover, in order to provide one and the same gear ratios, greater gearwheels in the row of eccentrically cycloidal engagement will have considerably smaller number of teeth, than for the involute engagement, which still greater increases the load carrying capacity at the same dimensions of gearwheels.

Figure 21:
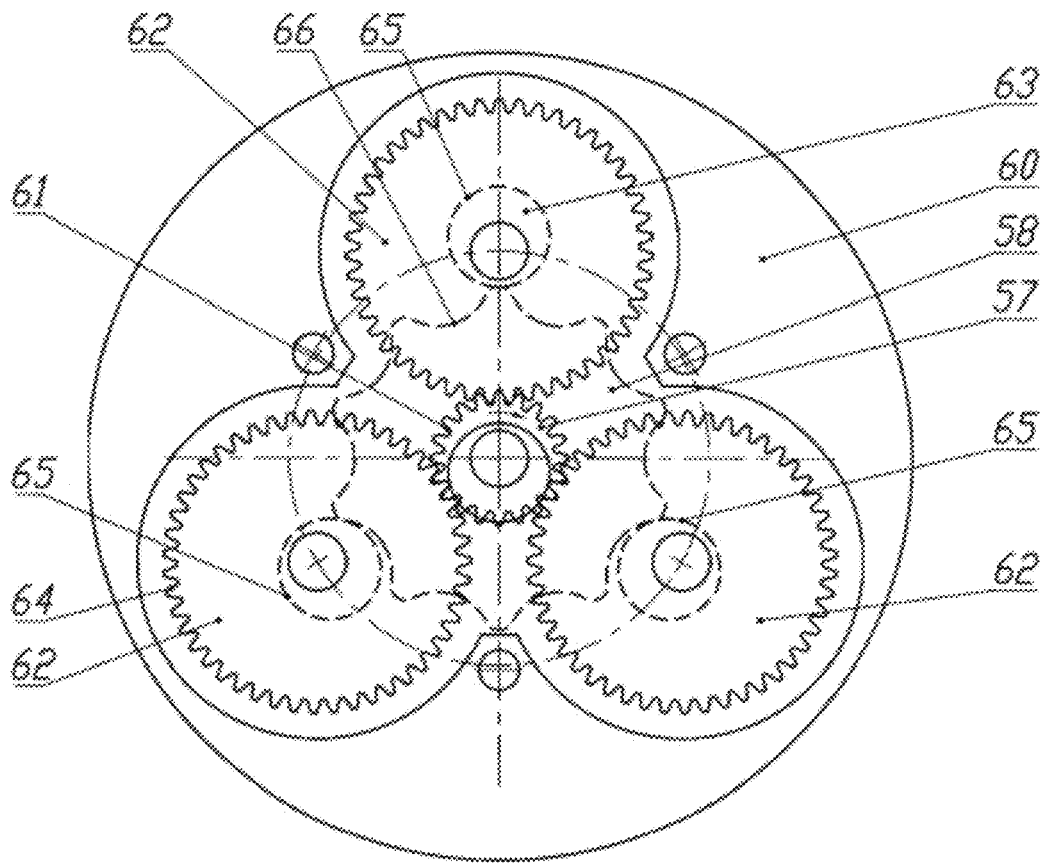
Figure 22:
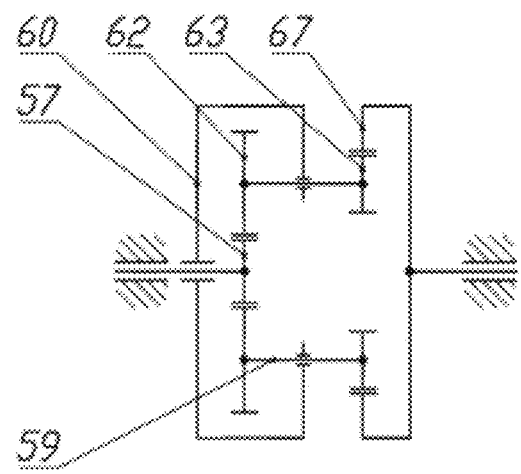
Figure 23:
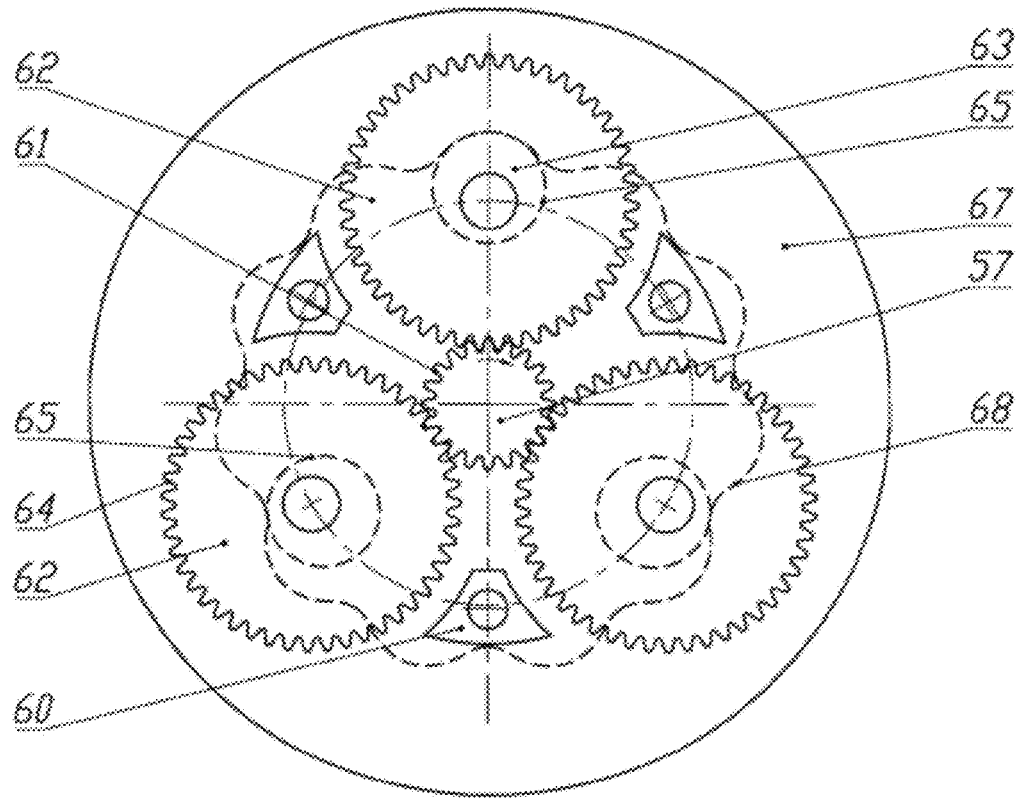

In a planetary mechanism, shown in FIGS. 22 and 23, one of central gearwheels, namely, the gearwheel 67 has the internal engagement with the second gearwheels 63 of double satellites 59. This gearwheel has the internal rim 68 of a cycloidal shape. All other elements of the mechanism are the same as in FIGS. 20 and 21, and they have the same designations. Such scheme for usual involute gearwheels give the gear ratio not more than 15. But in our case, when the carrier 60 is stationary and the central gearwheel 67 is driven, the gear ratio of the mechanism is $i_{57-67}=-Z_{62}/Z_{57} \cdot Z_{67}/Z_{63}=-Z_{62} \cdot Z_{67}/Z_{57}$, since $Z_{63}=1$. In a real design, for $Z_{57}=20$, $Z_{62}=47$ and $Z_{67}=11$, $i_{57-67}=-25.85$. When the carrier 60 is driven and the central gearwheel 67 is stationary, the gear ratio is determined by the expression $i_{57-60}=1+Z_{62} \cdot Z_{67}/Z_{57}$, and for the same values of $Z_{57}$, $Z_{62}$ and $Z_{67}$ it will be $i_{57-60}=26.85$, which is considerably greater than all possible values for such scheme of a planetary mechanism with a usual involute engagement of gearwheels.

Figure 24:
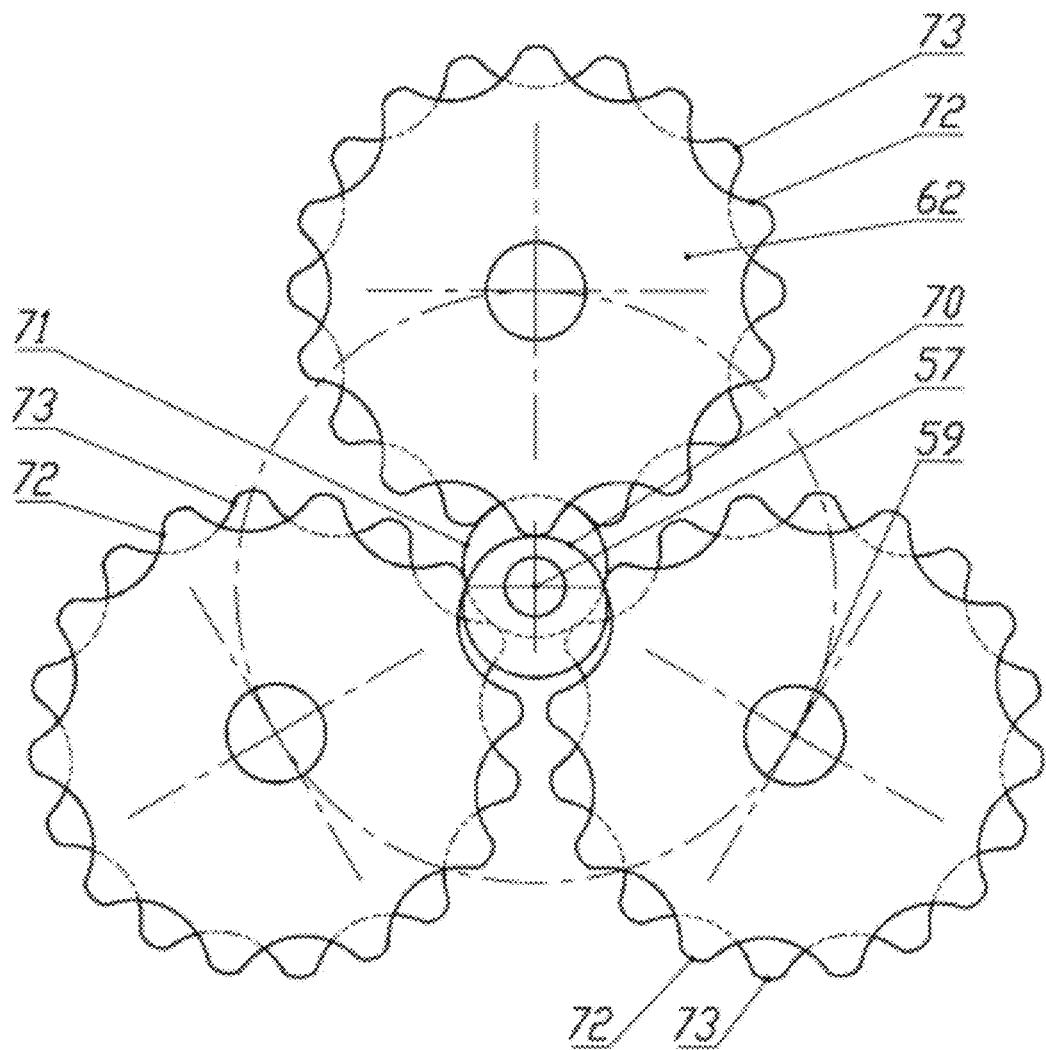

In order to increase the uniformity of gearwheels rotation and transmission of the torque, it is reasonable to perform step-type gearwheels with eccentrically cycloidal engagement, as it is shown in FIG. 24 for the eccentrically cycloidal engagement of the first row. The central single-toothed gearwheel 57 is performed as step-type, that is, it is assembled of two identical rims 70 and 71, having the shape of circumferences, eccentrically shifted in opposite sides, similarly to turn of eccentrics with respect to each other at 180 degrees. The angle of turn is determined as the angular pitch of a single-toothed gearwheel 57 (360 degrees), divided by the number of rims of the step-type gearwheel (number of rims is 2). Each of the rims 70 and 71 of the step-type gearwheel 57 interacts correspondingly with cycloidal rims 72 and 73 of step-type gearwheels 62 of satellites 59. Rims 72 and 73 are turned with respect to each other at the half of the angular pitch. For gearwheels in FIG. 24 this angle is 18 degrees.

When the gearwheel 57 is rotated clockwise, its rim 70 is in the phase of entering into engagement with rims 72 of the upper and left satellites, and the rim 71—with the rim 73 of the right satellite 59. As the result three rims of three satellites participate simultaneously in transmission of rotation, which increases the uniformity of torque transmission. Obviously, the mechanism with step-type gearwheels will also be serviceable with two satellites, since in any position the gearwheels will have at least two rims in the phase of entering into the engagement for the total number of satellites in this row equal to 4.

Figure 25:
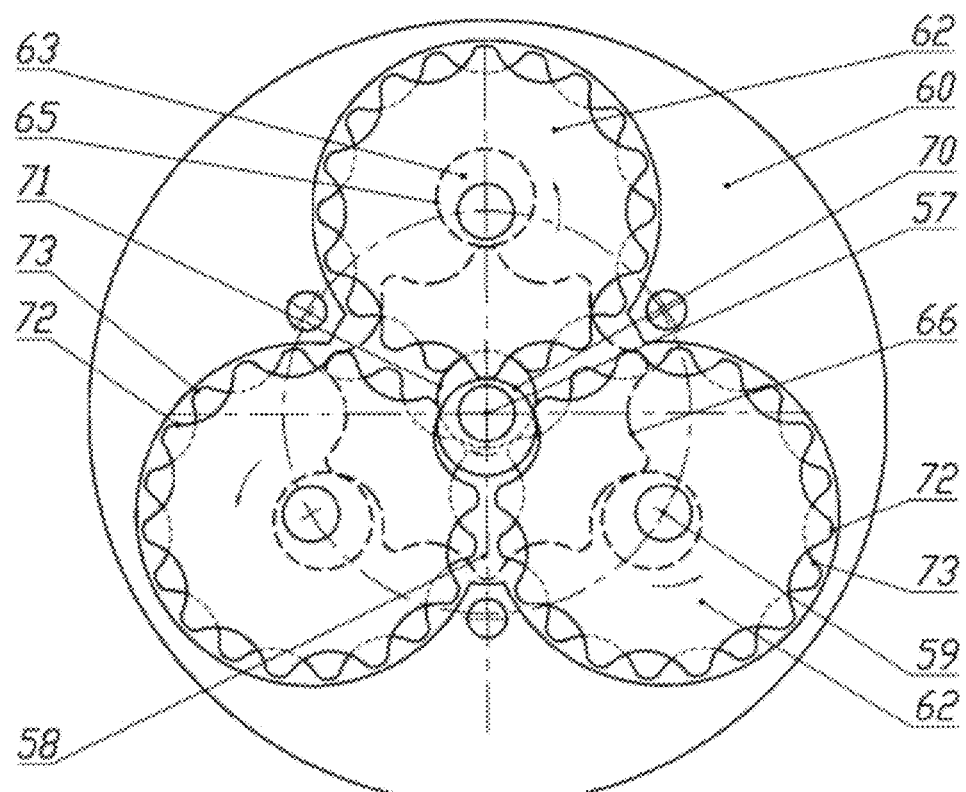
Figure 26:
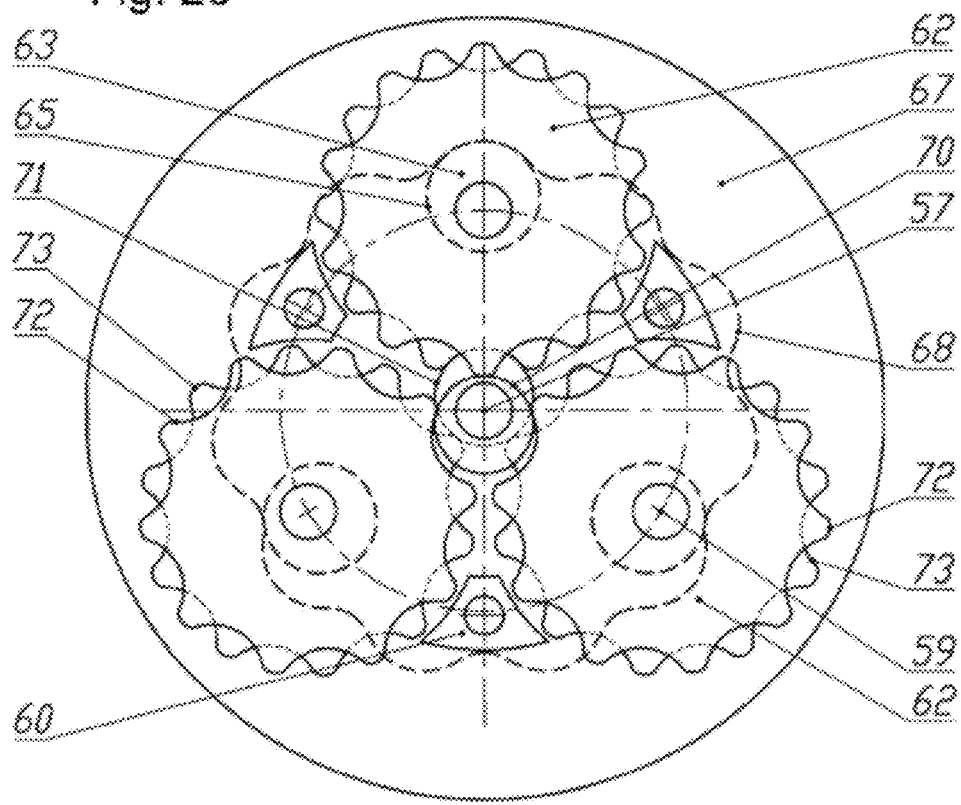

For still greater increase of the gear ratio, the engagement of both rows can be made eccentrically cycloidal (see FIGS. 25 and 26). FIG. 25 corresponds to the scheme in FIG. 20 with all gearwheels with external engagement. The first row of the engagement is performed with step-type gearwheels, as it is shown in FIG. 24. The central gearwheel 57 with the external engagement is performed as step-type, consisting of two identical rims 70 and 71. Rims represent the circumferences, eccentrically shifted from the centre of the gearwheel and turned with respect to each other at the half of the angular pitch, since there are 2 rims in the gearwheel. The angle of turn is 180 degrees, that is, rims 70 and 71 are eccentrics, shifted in opposite sides. The first gearwheels 62 of double satellites 59 are also made step-type, consisting of identical cycloidal rims 72 and 73 turned with respect to each other. The angle of turn of these rims with respect to each other is also the half of the angular pitch, and for 10 teeth the angle of turn is equal to 18 degrees. The rim 70 of the gearwheel 57 is engaged with rims 73 of the same gearwheels. Eccentrically cycloidal engagement in the second row is performed as it is shown in FIG. 21 and its elements are designated similarly. That is, rims 65 of the second gearwheels 63 of satellites 59 are performed as eccentrically shifted circumferences, and the rim 66 of the central gearwheel 58 with external engagement is made cycloidal.

FIG. 26 shows eccentrically cycloidal engagement in both rows of the mechanism, made according to the scheme in FIG. 22. Here the gearwheels in the first row are also made step-type, as it is shown in FIG. 24. The difference between FIG. 26 and FIG. 25 is only in the central gearwheel 67 in the second row, which has the cycloidal profile 68 with internal engagement. The rest designations in FIG. 26 correspond to designations in FIG. 25.

Figure 27:
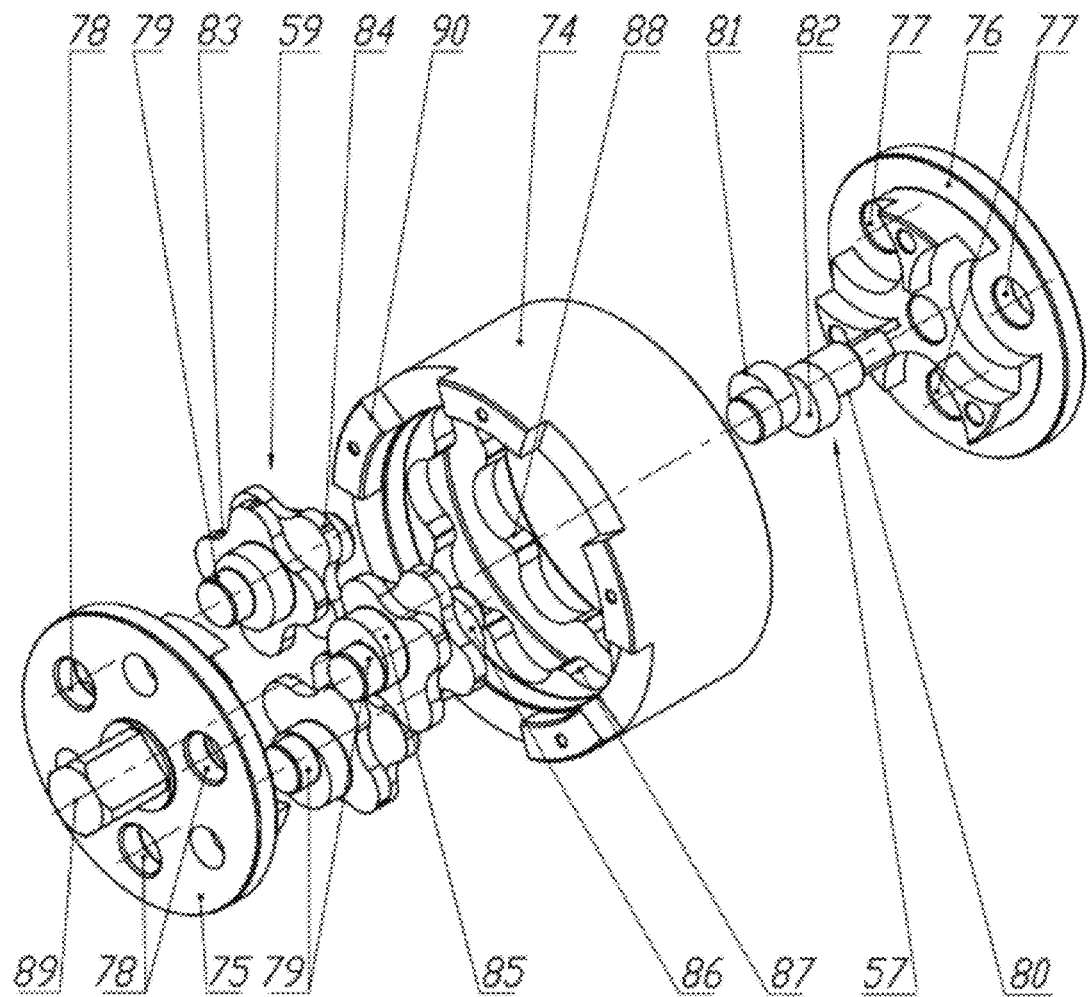

Let's consider a particular design of a planetary mechanism in FIG. 27, intended for operation as the torque intensifier (nut-running machine). Flange disks 75 and 76, rigidly connected with each other by tightening screws (they are not shown in fig.) are mounted in the cylindrical casing 74. The connected disks 75 and 76 form the carrier of the planetary mechanism. Three satellites 59 are mounted in holes 77 and 78 of disks 75 and 76 on axes 79. The central gearwheel 57 is the driving link and it is made as a single whole with the driving shaft 80. The gearwheel 57 is made as step-type, composed of two identical rims 81 and 82, representing eccentrics, shifted in opposite sides from the gearwheel axis 57. The rims 81 and 82 are engaged with identical cycloidal rims 83 and 84, the first step-type gearwheels of double satellites 59. The second gearwheels of satellites 59 are also made step-type, generated by two identical rims in the form of circumferences 85 and 86, eccentrically shifted in opposite directions. In order to avoid the cantilever load on the axis 79, these rims are spatially arranged along the axis and placed astride the rims 83 and 84 of the first gearwheels of satellites. The second central gearwheel with internal engagement is also made as step-type on the inner surface of the casing 74, and it represents two identical mutually spaced along the axis and turned with respect to each other cycloidal profiles 87 and 88. The driven link is the carrier, the square 89 (for removable head of the nut-running machine) is rigidly connected with its disk 75. The casing 74 has face splines 90, by their means it is fastened to stationary elements for the reactive moment take-off. The gear ratio of the gearbox of the nut-running machine is $i=1+Z_{83}Z_{87}=33$, where $Z_{83}$ and $Z_{87}$ are tooth numbers of cycloidal rims 83 of satellites 59 and cycloidal rims 87 of the central gearwheel with internal engagement.

It should be noted, that the following considerations must be pursued when choosing the supporting, driving and driven links in a particular mechanism. If the assigned gear ratio can be provided by only one row of the mechanism with eccentrically cycloidal engagement, then a usual involute engagement should be performed from the direction of the driving link, as it was already shown above. If it is necessary to perform eccentrically cycloidal engagements in both rows, the row of engagement from the direction of the driving link should be composed of step-type gearwheels.

Let's consider the operation of proposed mechanisms, made according to David scheme (FIG. 20) as gearboxes with the central gearwheel with external engagement 57 as the driving link and the stationary carrier 60. Let the gearwheel 57 with involute engagement rotate clockwise, as it is shown in FIGS. 21 and 22. The first gearwheels 62 of satellites 59 will be rotating in the opposite direction with the gear ratio, determined by the ratio of tooth numbers of rims 64 and 61. The second gearwheels 63 of the same satellites, representing eccentrically shifted circumferences 65, will also be rotating simultaneously with gearwheels 62. Here, the rims 65 of the upper and left satellites are in the phase of entering the engagement with cycloidal profile 66 of the central gearwheel 58 and they provide its turning in the direction, coinciding with the direction of rotation of the input gearwheel 57 with the gear ratio, equal to $Z_{62} \cdot Z_{58}/Z_{57}$.

Operation of the mechanism, performed according to the scheme in FIG. 22 and shown in FIG. 23, takes place similarly, but the gear ratio will be determined as $Z_{62} \cdot Z_{67}/Z_{57}$, i.e. the driven gearwheel 67 will be rotating in the opposite direction.

Let's consider the operation of mechanisms with two rows of eccentrically-cycloidal engagement in FIGS. 25 and 26 in the mode of a step-down gearbox. The driving link in this mode can be either the carrier 60, or the central gearwheel with external engagement 57. Let's take the gearwheel 57 as the driving link. When it is rotating clockwise, the rim 70 will be in the phase of entering the engagement with rims 72 of the upper and left satellites 59, rotating them counterclockwise. At the same time the second rim 71 of the step-type gearwheel 57 will be in force engagement with rims 73 of the left and right satellites. Therefore, the power flow in the first row will be transmitted by all three satellites. The rotation of satellites 59 counterclockwise means the simultaneous rotation of the second gearwheels 63 of satellites. Here, rims 65 of these gearwheels will be in the phase of entering the engagement with cycloidal rim 66 only for the left and upper satellites. Satellites, entering the engagement, change each other in turn, however, in any instant at least one satellite participates in transmission of rotation to the central gearwheel 58. The gearwheel 58 rotates in the same direction as the driving gearwheel 57. The gear ratio in the scheme is determined as $Z_{62} \cdot Z_{58}$, which is in $Z_{57}$ times higher than for the gearbox with one row of eccentrically cycloidal engagement in FIG. 21. If the carrier 60 is chosen as the driving link, then the gear ratio will be equal to $1-Z_{58} \cdot Z_{62}$.

Operation of the gearbox in FIG. 26 will differ only by the opposite direction of rotation of the driven link 67 and by the value of gear ratio, which will be determined as $Z_{62} \cdot Z_{67}$, that is also in $Z_{57}$ higher than for the gearbox with one row of eccentrically cycloidal engagement in FIG. 23.

The torque intensifier in FIG. 27 operates as follows. The driving shaft 80 rotates the central gearwheel 57 with two identical single-toothed rims 81 and 82 as eccentrics, shifted in opposite directions from the axis. Rotation is transmitted to cycloidal rims 83 and 84 of satellites 59 with the number of teeth equal to 4. Satellites 59 rotate jointly with rims 85 and 86 of the second gearwheels of satellites. Rims 85 and 86 have one tooth with the profile of the eccentrically shifted circumference. When these rims roll around cycloidal rims 87 and 88 of the stationary casing 74, the carrier, generated by face disks 75 and 76, starts turning. The carrier is the driven link. The gear ratio of the torque intensifier is 33. The mechanism has relatively small overall dimensions for rather big tooth dimensions, which determine the increase of its load carrying capacity. Moreover, cycloidal and eccentric teeth during the process of operation undergo mainly compression stresses, and in the involute engagement the pinion tooth works in bending. It is known, that according to allowable stresses, the strength of steels in compression is considerably higher than in bending.

Therefore, a new type of the toothed engagement is proposed in the claim: the eccentric circumference—the cycloidal curve. Toothed mechanisms with this engagement possess the increased load carrying capacity and high gear ratio at minimum overall dimensions. Big reduced radius of curvature of teeth in engagement, and also the tooth contact of convex-concave surfaces permit to increase the allowable contact stresses, that still greater increases the load carrying capacity of the gear. The engagement possesses the increased efficiency, since is has minimum friction losses.

While this invention has been particularly shown and described with references to preferred embodiments thereof, it will be understood by those skilled in the art that various changes in form and details may be made therein without departing from the scope of the invention encompassed by the appended claims.

What is claimed is:

1. Engaged gearwheels with curvilinear teeth, comprising: a smaller pinion gearwheel comprising a single tooth, the profile of the pinion being a helical surface generated by continuous turning of a disk with respect to an eccentric axis, and
 a greater gearwheel comprising helical teeth with cycloid cross-section in linear contact with the helical surface of the pinion.

2. The engaged gearwheels of claim 1, wherein the angle of helical overlap of the pinion is over 180 degrees.

3. The engaged gearwheels of claim 1,
 wherein the gearwheels are cylindrical with parallel axes, and
 wherein the greater gearwheel has an external engagement tooth profile equidistant to epicycloid.

4. The engaged gearwheels of claim 1,
 wherein the gearwheels are cylindrical with parallel axes, and
 wherein the greater gearwheel has an internal engagement tooth profile equidistant to hypocycloid.

5. The engaged gearwheels of claim 1,
 wherein the gearwheels are bevel with intersecting axes, and
 wherein
  the greater gearwheel has cycloidal cross-sections with respect to planes normal to its bevel surface, or
  the greater gearwheel has cycloidal cross-sections with respect to spherical surfaces centered at the intersection of the axes.

6. The engaged gearwheels of claim 1, wherein the gearwheels have herring-bone helical teeth.

7. Engaged composite gearwheels, comprising:
 a smaller gearwheel and
 a greater gearwheel;
 wherein each gearwheel comprises at least three connected gear rims rotated at the same angle with respect to each other,
 wherein each gear rim of the smaller gearwheel is eccentrically shifted with respect to an axis of the smaller gearwheel, and
 wherein each gear rim of the greater gearwheel has a cycloidal cross-section.

8. The engaged composite gearwheels of claim 7, wherein the gear rims are cylindrical with external engagement.

9. The engaged composite gearwheels of claim 7, wherein the gear rims are cylindrical and the gear rims of the greater gearwheel have internal engagement.

10. The engaged composite gearwheels of claim 7, wherein the gear rims are bevel.

11. A planetary James type gearing, comprising
 a central gearwheel with external engagement,
 a central gearwheel with internal engagement,
 a carrier, and
 at least three satellites, engaged with both gearwheels,
 wherein the central gearwheel with external engagement is single-toothed with a tooth profile of eccentrically shifted circumferences,
 wherein the satellites have cycloidal teeth, and
 wherein the central gearwheel with internal engagement is pin type or cycloidal.

12. The planetary gearing of claim 11,
 wherein the central gearwheel with external engagement comprises at least two rims, turned with respect to each other,
 wherein the satellites are positioned in parallel panes, adjacent satellites always being positioned in different planes, and
 wherein the satellites in each plane are engaged with a rim of the central gearwheel with external engagement.

13. The planetary gearing of claim 11,
 wherein each of the central gearwheels and each of the satellites comprises at least two rims turned with respect to each other, and
 wherein the corresponding rims are engaged.

14. A planetary David type gearing, comprising:
 doubled satellites, each doubled satellite comprising a first gearwheel and a second gearwheel,
 a carrier, and
 two rows of engagement comprising
  a first central gearwheel engaged with the first gearwheels of the doubled satellites, and
  a second central gearwheel engaged with the second gearwheels of the doubled satellites,
 wherein at least one of the rows of engagement is eccentrically cycloidal, has at least three satellites, and
 wherein in the at least one of the rows of engagement a gearwheel with a smaller diameter is single-toothed with a tooth profile of eccentrically shifted circumference and a gearwheel with a greater diameter has cycloidal teeth.

15. The planetary gearing of claim 14, wherein in the at least one of the rows of engagement gearwheels are staggered and comprise at least two identical gear rims, turned with respect to each other at an angle equal to the angular pitch of teeth divided by the number of the gear rims in the gearwheel.

* * * * *